(12) United States Patent
Margis

(10) Patent No.: US 9,872,154 B2
(45) Date of Patent: *Jan. 16, 2018

(54) SYSTEM AND METHOD FOR RECEIVING BROADCAST CONTENT ON A MOBILE PLATFORM DURING TRAVEL

(71) Applicant: Panasonic Avionics Corportion, Lake Forest, CA (US)

(72) Inventor: Paul Anthony Margis, Irvine, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 14/855,066

(22) Filed: Sep. 15, 2015

(65) Prior Publication Data

US 2016/0007169 A1    Jan. 7, 2016

Related U.S. Application Data

(63) Continuation of application No. 13/692,846, filed on Dec. 3, 2012, now Pat. No. 9,185,433, which is a continuation of application No. 12/237,253, filed on Sep. 24, 2008, now Pat. No. 8,326,282.

(60) Provisional application No. 60/974,678, filed on Sep. 24, 2007.

(51) Int. Cl.
*H04W 4/06* (2009.01)
*H04B 7/185* (2006.01)
(Continued)

(52) U.S. Cl.
CPC ........... *H04W 4/06* (2013.01); *B64D 11/0624* (2014.12); *H04B 1/3822* (2013.01);
(Continued)

(58) Field of Classification Search
CPC ............. B64D 11/0624; H04B 1/3822; H04B 7/18508; H04H 20/62; H04N 21/00;
(Continued)

(56) References Cited

U.S. PATENT DOCUMENTS 3,037,812 A   6/1962   Monroe
3,980,954 A   9/1976   Whyte
(Continued)

FOREIGN PATENT DOCUMENTS

CN   1104160 A   6/1995
CN   1462552 A   12/2003
(Continued)

OTHER PUBLICATIONS

Examiner's Report, AU Appln No. 2004251677, Sep. 26, 2008.
(Continued)

*Primary Examiner* — Robert Lopata
(74) *Attorney, Agent, or Firm* — Orrick Herrington & Sutcliffe LLP

(57) ABSTRACT

A vehicle information system for passenger vehicles, such as automobiles and aircraft, and methods for manufacturing and using same. The vehicle information system includes a broadband communication system with a broadband antenna system and a broadband control system. Exploiting the advent of high-speed connectivity solutions, the vehicle information system supports a low-cost, high-capacity bidirectional data connection with a terrestrial content system and thereby can be established as another node on the "Worldwide Net." The vehicle information system likewise provides wireless access points for communicating with passengers' personal media devices. As desired, the vehicle information system can support mobile telephone connectivity and/or presentation of live integrated digital television (IDTV) programming. The vehicle information system thereby provides enhanced information, entertainment, and communication services during travel.

20 Claims, 14 Drawing Sheets

(51) Int. Cl.

| | | |
|---|---|---|
| *H04N 7/173* | (2011.01) | |
| *H04N 21/41* | (2011.01) | |
| *H04N 21/414* | (2011.01) | |
| *H04N 21/4363* | (2011.01) | |
| *H04N 21/4367* | (2011.01) | |
| *H04N 21/472* | (2011.01) | |
| *H04N 21/4782* | (2011.01) | |
| *H04N 21/4786* | (2011.01) | |
| *H04N 21/61* | (2011.01) | |
| *H04N 21/00* | (2011.01) | |
| *B64D 11/06* | (2006.01) | |
| *H04B 1/3822* | (2015.01) | |
| *H04W 12/08* | (2009.01) | |
| *H04H 20/62* | (2008.01) | |

(52) U.S. Cl.
CPC ..... *H04B 7/18508* (2013.01); *H04N 7/17318* (2013.01); *H04N 21/00* (2013.01); *H04N 21/4126* (2013.01); *H04N 21/41422* (2013.01); *H04N 21/4363* (2013.01); *H04N 21/4367* (2013.01); *H04N 21/4782* (2013.01); *H04N 21/4786* (2013.01); *H04N 21/47202* (2013.01); *H04N 21/6125* (2013.01); *H04N 21/6143* (2013.01); *H04N 21/6175* (2013.01); *H04N 21/6193* (2013.01); *H04W 12/08* (2013.01); *H04H 20/62* (2013.01)

(58) Field of Classification Search
CPC ......... H04N 21/4126; H04N 21/41422; H04N 21/4363; H04N 21/4367; H04N 21/47202; H04N 21/4782; H04N 21/4786; H04N 21/6125; H04N 21/6143; H04N 21/6175; H04N 21/6193; H04N 7/17318; H04W 12/08; H04W 4/06
USPC ....................................................... 370/329
See application file for complete search history.

(56) References Cited

U.S. PATENT DOCUMENTS

| | | |
|---|---|---|
| 4,367,488 A | 1/1983 | Leventer et al. |
| 4,584,603 A | 4/1986 | Harrison |
| 4,647,980 A | 3/1987 | Steventon et al. |
| 4,742,544 A | 5/1988 | Kupnicki et al. |
| 4,774,514 A | 9/1988 | Hildebrandt et al. |
| 4,866,515 A | 9/1989 | Tagawa et al. |
| 4,866,704 A | 9/1989 | Bergman |
| 4,866,732 A | 9/1989 | Carey et al. |
| 4,887,152 A | 12/1989 | Matsuzaki et al. |
| 4,890,104 A | 12/1989 | Takanabe et al. |
| 4,896,209 A | 1/1990 | Matsuzaki et al. |
| 4,897,714 A | 1/1990 | Ichise et al. |
| 4,939,527 A | 7/1990 | Lamberty et al. |
| 4,958,381 A | 9/1990 | Toyoshima |
| 4,975,696 A | 12/1990 | Salter, Jr. et al. |
| 5,005,183 A | 4/1991 | Carey et al. |
| 5,034,808 A | 7/1991 | Murray |
| 5,123,015 A | 6/1992 | Brady, Jr. et al. |
| 5,151,896 A | 9/1992 | Bowman et al. |
| 5,177,616 A | 1/1993 | Riday |
| 5,189,671 A | 2/1993 | Cheng |
| 5,208,590 A | 5/1993 | Pitts |
| 5,237,659 A | 8/1993 | Takats |
| 5,276,455 A | 1/1994 | Fitzsimmons et al. |
| 5,289,272 A | 2/1994 | Rabowsky et al. |
| 5,295,089 A | 3/1994 | Ambasz |
| 5,311,302 A | 5/1994 | Berry et al. |
| 5,311,515 A | 5/1994 | Henderson et al. |
| 5,325,131 A | 6/1994 | Penney |
| 5,383,178 A | 1/1995 | Unverrich |
| 5,390,326 A | 2/1995 | Shah |
| 5,410,754 A | 4/1995 | Klotzbach et al. |
| 5,444,762 A | 8/1995 | Frey et al. |
| 5,463,656 A | 10/1995 | Polivka et al. |
| 5,469,363 A | 11/1995 | Saliga |
| 5,481,478 A | 1/1996 | Palmieri et al. |
| 5,493,702 A | 2/1996 | Crowley et al. |
| 5,524,272 A | 6/1996 | Podowski et al. |
| 5,529,265 A | 6/1996 | Sakurai |
| 5,555,466 A | 9/1996 | Scribner et al. |
| 5,557,342 A | 9/1996 | Eto et al. |
| 5,557,656 A | 9/1996 | Ray et al. |
| 5,568,484 A | 10/1996 | Margis |
| 5,596,647 A | 1/1997 | Wakai et al. |
| 5,610,822 A | 3/1997 | Murphy |
| 5,617,331 A | 4/1997 | Wakai et al. |
| 5,640,002 A | 6/1997 | Ruppert et al. |
| 5,666,291 A | 9/1997 | Scott et al. |
| 5,701,582 A | 12/1997 | DeBey |
| 5,706,353 A | 1/1998 | Arai et al. |
| 5,709,448 A | 1/1998 | Jennings et al. |
| 5,711,014 A | 1/1998 | Crowley et al. |
| 5,745,159 A | 4/1998 | Wax et al. |
| 5,760,819 A | 6/1998 | Sklar et al. |
| 5,790,423 A | 8/1998 | Lau et al. |
| 5,790,787 A | 8/1998 | Scott et al. |
| 5,801,751 A | 9/1998 | Sklar et al. |
| 5,808,660 A | 9/1998 | Sekine et al. |
| 5,831,664 A | 11/1998 | Wharton et al. |
| 5,832,380 A | 11/1998 | Ray et al. |
| 5,835,127 A | 11/1998 | Booth et al. |
| 5,857,869 A | 1/1999 | Parcel et al. |
| 5,878,345 A | 3/1999 | Ray et al. |
| 5,889,268 A | 3/1999 | Swartz |
| 5,889,775 A | 3/1999 | Sawicz et al. |
| 5,929,895 A | 7/1999 | Berry et al. |
| 5,950,129 A | 9/1999 | Schmid et al. |
| 5,953,429 A | 9/1999 | Wakai et al. |
| 5,957,407 A | 9/1999 | Auestad |
| 5,959,596 A | 9/1999 | McCarten et al. |
| 5,960,343 A | 9/1999 | Ray et al. |
| 5,966,442 A | 10/1999 | Sachdev |
| 5,973,722 A | 10/1999 | Wakai et al. |
| 5,990,928 A | 11/1999 | Sklar et al. |
| 6,003,008 A | 12/1999 | Postrel et al. |
| 6,012,679 A | 1/2000 | Auestad |
| 6,014,381 A | 1/2000 | Troxel et al. |
| 6,047,165 A | 4/2000 | Wright et al. |
| 6,058,288 A | 5/2000 | Reed et al. |
| 6,078,348 A | 6/2000 | Klosterman et al. |
| 6,108,523 A | 8/2000 | Wright et al. |
| 6,108,539 A | 8/2000 | Ray et al. |
| 6,129,274 A | 10/2000 | Suzuki |
| 6,130,727 A | 10/2000 | Toyozumi |
| 6,135,549 A | 10/2000 | Demick et al. |
| 6,151,497 A | 11/2000 | Yee et al. |
| 6,154,186 A | 11/2000 | Smith et al. |
| 6,160,998 A | 12/2000 | Wright et al. |
| 6,163,681 A | 12/2000 | Wright et al. |
| 6,167,238 A | 12/2000 | Wright |
| 6,173,159 B1 | 1/2001 | Wright et al. |
| 6,177,887 B1 | 1/2001 | Jerome |
| 6,181,990 B1 | 1/2001 | Grabowsky et al. |
| 6,201,797 B1 | 3/2001 | Leuca et al. |
| 6,208,307 B1 | 3/2001 | Frisco et al. |
| 6,216,065 B1 | 4/2001 | Hall et al. |
| 6,249,913 B1 | 6/2001 | Galipeau et al. |
| 6,278,936 B1 | 8/2001 | Jones |
| 6,285,878 B1 | 9/2001 | Lai |
| 6,308,045 B1 | 10/2001 | Wright et al. |
| 6,321,084 B1 | 11/2001 | Horrer |
| 6,338,045 B1 | 1/2002 | Pappas |
| 6,345,720 B1 | 2/2002 | Redden et al. |
| 6,370,656 B1 | 4/2002 | Olarig et al. |
| 6,377,802 B1 | 4/2002 | McKenna et al. |
| 6,390,920 B1 | 5/2002 | Infiesto et al. |
| 6,392,692 B1 | 5/2002 | Monroe |
| 6,408,180 B1 | 6/2002 | McKenna et al. |
| 6,484,011 B1 | 11/2002 | Thompson et al. |
| 6,487,540 B1 | 11/2002 | Smith et al. |

(56) References Cited

U.S. PATENT DOCUMENTS

| | | |
|---|---|---|
| 6,499,027 B1 | 12/2002 | Weinberger |
| 6,507,279 B2 | 1/2003 | Loof |
| 6,507,952 B1 | 1/2003 | Miller et al. |
| 6,519,693 B1 | 2/2003 | Debey |
| 6,522,867 B1 | 2/2003 | Wright et al. |
| 6,529,706 B1 | 3/2003 | Mitchell |
| 6,538,656 B1 | 3/2003 | Cheung et al. |
| 6,542,086 B2 | 4/2003 | Baumgartner et al. |
| 6,549,754 B1 | 4/2003 | Miller et al. |
| 6,559,812 B1 | 5/2003 | McCarten et al. |
| 6,570,881 B1 | 5/2003 | Wils et al. |
| 6,574,338 B1 | 6/2003 | Sachdev |
| 6,594,471 B1 | 7/2003 | Crowley et al. |
| 6,598,227 B1 | 7/2003 | Berry et al. |
| 6,600,418 B2 | 7/2003 | Francis et al. |
| 6,609,103 B1 | 8/2003 | Kolls |
| 6,611,537 B1 | 8/2003 | Edens et al. |
| 6,618,580 B2 | 9/2003 | Parrott et al. |
| 6,622,124 B1 | 9/2003 | Kolls |
| 6,637,484 B1 | 10/2003 | Kraft |
| 6,643,510 B2 | 11/2003 | Taylor |
| 6,650,898 B2 | 11/2003 | Jochim et al. |
| 6,658,595 B1 | 12/2003 | Thamattoor |
| 6,661,353 B1 | 12/2003 | Gopen |
| 6,693,236 B1 | 2/2004 | Gould et al. |
| 6,702,604 B1 | 3/2004 | Moscovitch |
| 6,725,035 B2 | 4/2004 | Jochim et al. |
| 6,736,315 B2 | 5/2004 | Swartz |
| 6,741,841 B1 | 5/2004 | Mitchell |
| 6,745,010 B2 | 6/2004 | Wright et al. |
| 6,748,597 B1 | 6/2004 | Frisco et al. |
| 6,757,712 B1 | 6/2004 | Bastian et al. |
| 6,775,545 B2 | 8/2004 | Wright et al. |
| 6,782,392 B1 | 8/2004 | Weinberger et al. |
| 6,788,935 B1 * | 9/2004 | McKenna ............ H01Q 1/246 455/11.1 |
| 6,796,495 B2 | 9/2004 | Stahl et al. |
| 6,807,148 B1 | 10/2004 | Eicher |
| 6,807,538 B1 | 10/2004 | Weinberger et al. |
| 6,810,527 B1 * | 10/2004 | Conrad ................ H04N 7/163 348/E7.061 |
| 6,866,225 B2 | 3/2005 | Jones et al. |
| 6,876,905 B2 | 4/2005 | Farley et al. |
| 6,885,845 B1 | 4/2005 | Crowley et al. |
| 6,885,863 B2 | 4/2005 | Parkman et al. |
| 6,885,864 B2 | 4/2005 | McKenna et al. |
| 6,889,042 B2 | 5/2005 | Rousseau et al. |
| 6,892,052 B2 | 5/2005 | Kotola et al. |
| 6,899,390 B2 | 5/2005 | Sanfrod et al. |
| 6,937,164 B2 | 8/2005 | Thomson et al. |
| 6,938,258 B1 | 8/2005 | Weinberger et al. |
| 6,947,726 B2 | 9/2005 | Rockwell |
| 6,971,608 B2 | 12/2005 | Harrington et al. |
| 6,973,479 B2 | 12/2005 | Brady, Jr. et al. |
| 6,983,312 B1 | 1/2006 | O'Neil |
| 6,985,588 B1 | 1/2006 | Glick et al. |
| 6,985,942 B2 | 1/2006 | D'Annunzio et al. |
| 6,990,338 B2 | 1/2006 | Miller et al. |
| 7,003,293 B2 | 2/2006 | D'Annunzio |
| 7,036,889 B2 | 5/2006 | Sanfrod et al. |
| 7,062,268 B2 | 6/2006 | McKenna |
| 7,070,150 B2 | 7/2006 | Jones et al. |
| 7,100,187 B2 | 8/2006 | Pierzga et al. |
| 7,107,062 B2 | 9/2006 | Cruz et al. |
| 7,113,780 B2 | 9/2006 | McKenna et al. |
| 7,124,426 B1 | 10/2006 | Tsuria et al. |
| 7,136,621 B2 | 11/2006 | de La Chapelle et al. |
| 7,161,788 B2 | 1/2007 | Richie, Jr. et al. |
| 7,162,235 B1 | 1/2007 | Gilbert |
| 7,171,197 B2 | 1/2007 | Miller et al. |
| 7,177,638 B2 | 2/2007 | Funderburk et al. |
| 7,187,927 B1 | 3/2007 | Mitchell |
| 7,233,958 B2 | 6/2007 | Weng |
| D551,197 S | 9/2007 | Vitito |
| 7,280,825 B2 | 10/2007 | Keen et al. |
| 7,286,503 B1 | 10/2007 | Clarke et al. |
| 7,299,013 B2 | 11/2007 | Rotta et al. |
| D556,711 S | 12/2007 | Lee et al. |
| D564,991 S | 3/2008 | Vitito |
| 7,343,157 B1 | 3/2008 | Mitchell |
| 7,354,019 B2 | 4/2008 | Bauer |
| 7,359,700 B2 | 4/2008 | Swensen et al. |
| 7,400,858 B2 | 7/2008 | Crowley et al. |
| 7,406,309 B2 | 7/2008 | Usher et al. |
| 7,454,203 B2 | 11/2008 | Levitan |
| 7,460,866 B2 | 12/2008 | Salkini et al. |
| 7,483,696 B1 | 1/2009 | Mitchell |
| 7,486,927 B2 | 2/2009 | Kallio et al. |
| 7,496,361 B1 | 2/2009 | Mitchell et al. |
| D590,787 S | 4/2009 | Vitito |
| D594,431 S | 6/2009 | Vitito |
| D597,980 S | 8/2009 | Vitito |
| D635,108 S | 3/2011 | Hughes et al. |
| D637,984 S | 5/2011 | Willard |
| D640,215 S | 6/2011 | Hanson-Abbott |
| D640,654 S | 6/2011 | Montag et al. |
| D669,873 S | 10/2012 | Margis et al. |
| D669,874 S | 10/2012 | Margis et al. |
| 8,376,457 B2 | 2/2013 | Muirhead |
| D677,639 S | 3/2013 | Margis et al. |
| 2001/0025377 A1 | 9/2001 | Hinderks |
| 2002/0013150 A1 | 1/2002 | McKenna et al. |
| 2002/0045444 A1 | 4/2002 | User et al. |
| 2002/0045484 A1 | 4/2002 | Eck |
| 2002/0046406 A1 | 4/2002 | Chelehmal et al. |
| 2002/0058478 A1 | 5/2002 | de La Chapelle et al. |
| 2002/0059363 A1 | 5/2002 | Katz et al. |
| 2002/0059614 A1 | 5/2002 | Lipsanen et al. |
| 2002/0065711 A1 | 5/2002 | Fujisawa et al. |
| 2002/0069293 A1 | 6/2002 | Natalio |
| 2002/0087992 A1 | 7/2002 | Bengeult et al. |
| 2002/0094829 A1 | 7/2002 | Ritter |
| 2002/0095574 A1 | 7/2002 | Kori |
| 2002/0095680 A1 | 7/2002 | Davidson |
| 2002/0136540 A1 | 9/2002 | Adams et al. |
| 2002/0152470 A1 | 10/2002 | Hammond |
| 2002/0162113 A1 | 10/2002 | Hunter |
| 2002/0164960 A1 | 11/2002 | Slaughter et al. |
| 2002/0170060 A1 | 11/2002 | Lyman |
| 2002/0178451 A1 | 11/2002 | Ficco |
| 2002/0184555 A1 | 12/2002 | Wong et al. |
| 2002/0197990 A1 | 12/2002 | Jochim et al. |
| 2003/0003899 A1 | 1/2003 | Tashiro et al. |
| 2003/0008652 A1 | 1/2003 | Jochim et al. |
| 2003/0020991 A1 | 1/2003 | Chang |
| 2003/0043760 A1 * | 3/2003 | Taylor ............... H04B 7/18584 370/316 |
| 2003/0047647 A1 | 3/2003 | Poblete |
| 2003/0055975 A1 | 3/2003 | Nelson et al. |
| 2003/0060190 A1 | 3/2003 | Mallart |
| 2003/0067542 A1 | 4/2003 | Monroe |
| 2003/0069015 A1 | 4/2003 | Brinkley et al. |
| 2003/0069990 A1 | 4/2003 | D'Annunzio et al. |
| 2003/0084130 A1 | 5/2003 | D'Annunzio |
| 2003/0084451 A1 | 5/2003 | Pierzga et al. |
| 2003/0085818 A1 | 5/2003 | Renton et al. |
| 2003/0087672 A1 | 5/2003 | Kattukaran et al. |
| 2003/0093798 A1 | 5/2003 | Rogerson |
| 2003/0107248 A1 | 6/2003 | Sanford et al. |
| 2003/0126614 A1 | 7/2003 | Staiger |
| 2003/0130769 A1 | 7/2003 | Farley et al. |
| 2003/0148736 A1 | 8/2003 | Wright et al. |
| 2003/0158958 A1 | 8/2003 | Chiu |
| 2003/0160710 A1 | 8/2003 | Baumgartner et al. |
| 2003/0161411 A1 | 8/2003 | McCorkle et al. |
| 2003/0169563 A1 | 9/2003 | Adams |
| 2003/0184449 A1 | 10/2003 | Baumgartner et al. |
| 2003/0217363 A1 | 11/2003 | Brady, Jr. et al. |
| 2003/0233469 A1 | 12/2003 | Knowlson et al. |
| 2003/0233658 A1 | 12/2003 | Keen et al. |
| 2003/0237016 A1 | 12/2003 | Johnson et al. |
| 2004/0001303 A1 | 1/2004 | Doblar et al. |
| 2004/0054923 A1 | 3/2004 | Seago et al. |
| 2004/0077308 A1 | 4/2004 | Sanford et al. |

(56) References Cited

U.S. PATENT DOCUMENTS

| | | |
|---|---|---|
| 2004/0078821 A1 | 4/2004 | Frisco et al. |
| 2004/0088412 A1 | 5/2004 | John et al. |
| 2004/0098745 A1 | 5/2004 | Marston et al. |
| 2004/0108963 A1 | 6/2004 | Clymer et al. |
| 2004/0111523 A1 | 6/2004 | Hall et al. |
| 2004/0123322 A1 | 6/2004 | Erkocevic et al. |
| 2004/0128688 A1 | 7/2004 | Seo |
| 2004/0133634 A1 | 7/2004 | Luke et al. |
| 2004/0139467 A1 | 7/2004 | Rogerson et al. |
| 2004/0142658 A1* | 7/2004 | McKenna ............... H01Q 1/007 455/11.1 |
| 2004/0147243 A1 | 7/2004 | McKenna |
| 2004/0167967 A1 | 8/2004 | Bastian et al. |
| 2004/0183346 A1 | 9/2004 | Sanford et al. |
| 2004/0198346 A1 | 10/2004 | Swensen et al. |
| 2004/0217234 A1 | 11/2004 | Jones et al. |
| 2004/0235469 A1 | 11/2004 | Krug |
| 2004/0252965 A1 | 12/2004 | Moreno et al. |
| 2004/0252966 A1 | 12/2004 | Holloway et al. |
| 2004/0253951 A1 | 12/2004 | Chang et al. |
| 2005/0021602 A1 | 1/2005 | Noel et al. |
| 2005/0026608 A1 | 2/2005 | Kallio et al. |
| 2005/0027787 A1 | 2/2005 | Kuhn et al. |
| 2005/0039208 A1 | 2/2005 | Veeck et al. |
| 2005/0044564 A1 | 2/2005 | Stopniewicz |
| 2005/0067530 A1 | 3/2005 | Schafer, Jr. et al. |
| 2005/0114894 A1 | 5/2005 | Hoerl |
| 2005/0132407 A1 | 6/2005 | Boyer, Jr. et al. |
| 2005/0136917 A1 | 6/2005 | Taylor |
| 2005/0138654 A1 | 6/2005 | Minne |
| 2005/0167546 A1 | 8/2005 | Jones et al. |
| 2005/0176368 A1 | 8/2005 | Young et al. |
| 2005/0177763 A1 | 8/2005 | Stoler |
| 2005/0181723 A1 | 8/2005 | Miller et al. |
| 2005/0193257 A1 | 9/2005 | Stoler |
| 2005/0202785 A1 | 9/2005 | Meyer |
| 2005/0215249 A1 | 9/2005 | Little et al. |
| 2005/0216938 A1 | 9/2005 | Brady, Jr. et al. |
| 2005/0239261 A1 | 10/2005 | Tai et al. |
| 2005/0251798 A1 | 11/2005 | Fraley |
| 2005/0256616 A1 | 11/2005 | Rhoads |
| 2005/0268319 A1 | 12/2005 | Brady, Jr. |
| 2005/0270373 A1 | 12/2005 | Trela |
| 2005/0273823 A1 | 12/2005 | Brady, Jr. et al. |
| 2005/0278753 A1 | 12/2005 | Brady, Jr. et al. |
| 2005/0278754 A1 | 12/2005 | Bleacher et al. |
| 2005/0281223 A1 | 12/2005 | D'Annunzio |
| 2006/0002372 A1* | 1/2006 | Smith .................. H04L 12/66 370/352 |
| 2006/0006287 A1 | 1/2006 | Ferguson et al. |
| 2006/0010438 A1 | 1/2006 | Brady, Jr. et al. |
| 2006/0030311 A1 | 2/2006 | Cruz et al. |
| 2006/0032979 A1 | 2/2006 | Mitchell et al. |
| 2006/0040612 A1 | 2/2006 | Min |
| 2006/0040660 A1 | 2/2006 | Cruz et al. |
| 2006/0044214 A1 | 3/2006 | Hong |
| 2006/0048196 A1 | 3/2006 | Yau |
| 2006/0088001 A1 | 4/2006 | Reitmann et al. |
| 2006/0107295 A1 | 5/2006 | Margis et al. |
| 2006/0128303 A1 | 6/2006 | Schedivy |
| 2006/0143662 A1 | 6/2006 | Easterling et al. |
| 2006/0154601 A1 | 7/2006 | Tewalt et al. |
| 2006/0174285 A1* | 8/2006 | Brady, Jr. ............... A63F 13/12 725/76 |
| 2006/0183450 A1 | 8/2006 | Cameron |
| 2006/0187959 A1 | 8/2006 | Kawaguchi et al. |
| 2006/0197750 A1 | 9/2006 | Kerr et al. |
| 2006/0212909 A1* | 9/2006 | Girard .................. H01Q 1/28 725/73 |
| 2006/0217121 A1 | 9/2006 | Soliman et al. |
| 2006/0234700 A1 | 10/2006 | Funderburk et al. |
| 2006/0250947 A1 | 11/2006 | Allen |
| 2006/0264173 A1 | 11/2006 | Gilbert |
| 2006/0270373 A1 | 11/2006 | So |
| 2006/0270470 A1 | 11/2006 | de La Chapelle et al. |
| 2006/0276127 A1 | 12/2006 | Cruz et al. |
| 2006/0277589 A1 | 12/2006 | Margis et al. |
| 2006/0291803 A1 | 12/2006 | Watson et al. |
| 2006/0293190 A1 | 12/2006 | Watson et al. |
| 2007/0021117 A1 | 1/2007 | McKenna et al. |
| 2007/0022018 A1 | 1/2007 | Suryanarayana et al. |
| 2007/0025240 A1 | 2/2007 | Snide |
| 2007/0026795 A1 | 2/2007 | de La Chapelle |
| 2007/0042772 A1 | 2/2007 | Salkini et al. |
| 2007/0044126 A1 | 2/2007 | Mitchell |
| 2007/0060133 A1 | 3/2007 | Spitzer et al. |
| 2007/0124046 A1* | 5/2007 | Ayoub ................... G06F 21/10 701/36 |
| 2007/0127460 A1* | 6/2007 | Wilber .................. H04L 67/12 370/389 |
| 2007/0130599 A1 | 6/2007 | Monroe |
| 2007/0155381 A1 | 7/2007 | Alberth et al. |
| 2007/0155421 A1 | 7/2007 | Alberth et al. |
| 2007/0185977 A1 | 8/2007 | Sato et al. |
| 2007/0202802 A1 | 8/2007 | Kallio et al. |
| 2007/0213009 A1 | 9/2007 | Higashida et al. |
| 2007/0258417 A1 | 11/2007 | Harvey et al. |
| 2007/0298741 A1 | 12/2007 | Harnist et al. |
| 2008/0004016 A1 | 1/2008 | Smee et al. |
| 2008/0023600 A1 | 1/2008 | Perlman |
| 2008/0040756 A1 | 2/2008 | Perlman |
| 2008/0084882 A1 | 4/2008 | Eruchimovitch |
| 2008/0085691 A1 | 4/2008 | Harvey et al. |
| 2008/0086554 A1* | 4/2008 | Royalty ............... H04L 63/1408 709/224 |
| 2008/0090567 A1 | 4/2008 | Gilbert |
| 2008/0104642 A1* | 5/2008 | Galipeau ................ H04N 7/10 725/76 |
| 2008/0109119 A1* | 5/2008 | Lee ..................... H04L 63/10 701/1 |
| 2008/0124054 A1 | 5/2008 | Bonar |
| 2008/0125112 A1 | 5/2008 | Clarke et al. |
| 2008/0127278 A1 | 5/2008 | Bonar |
| 2008/0130539 A1 | 6/2008 | Lauer et al. |
| 2008/0132212 A1 | 6/2008 | Lemond et al. |
| 2008/0133705 A1 | 6/2008 | Lemond et al. |
| 2008/0141314 A1 | 6/2008 | Lemond et al. |
| 2008/0146219 A1* | 6/2008 | Habermas .......... H04B 7/18523 455/428 |
| 2008/0181169 A1 | 7/2008 | Lauer et al. |
| 2008/0182573 A1 | 7/2008 | Lauer et al. |
| 2008/0274734 A1 | 11/2008 | Kostanic et al. |
| 2008/0299965 A1 | 12/2008 | Lagerman |
| 2008/0305762 A1* | 12/2008 | Malosh ............... H04B 7/18506 455/404.1 |
| 2009/0007193 A1 | 1/2009 | Correa et al. |
| 2009/0010200 A1 | 1/2009 | Lauer et al. |
| 2009/0042651 A1 | 2/2009 | Prabhu et al. |
| 2009/0052386 A1* | 2/2009 | Higashida ........... H04W 74/0816 370/329 |
| 2009/0077595 A1* | 3/2009 | Sizelove ................ G06F 1/1626 725/76 |
| 2009/0081947 A1 | 3/2009 | Margis |
| 2009/0096857 A1* | 4/2009 | Frisco ................ H04B 7/18508 348/14.02 |
| 2009/0112377 A1 | 4/2009 | Schalla et al. |
| 2009/0119721 A1* | 5/2009 | Perlman ................ H04N 7/24 725/76 |
| 2010/0014537 A1* | 1/2010 | Jacquet ................ H04L 45/02 370/411 |
| 2010/0187354 A1 | 7/2010 | Helfrich |
| 2010/0252680 A1 | 10/2010 | Porter |

FOREIGN PATENT DOCUMENTS

| | | |
|---|---|---|
| CN | 2849821 Y | 12/2006 |
| DE | 102008016172 A1 | 10/2009 |
| EP | 0 577 054 A | 1/1994 |
| EP | 0 767 594 A2 | 9/1997 |
| EP | 0 890 907 A1 | 1/1999 |
| EP | 0 930 513 A2 | 7/1999 |
| EP | 1 078 852 A2 | 2/2001 |
| EP | 1 217 833 A2 | 6/2002 |

(56) References Cited

FOREIGN PATENT DOCUMENTS

| | | |
|---|---|---|
| EP | 1 231 534 A1 | 8/2002 |
| EP | 1 217 833 A3 | 4/2004 |
| EP | 1 458 590 B | 6/2005 |
| JP | 58-46485 | 3/1983 |
| JP | 62-238693 | 10/1987 |
| JP | H06-285259 A | 10/1994 |
| JP | H09-512401 A | 11/1995 |
| JP | 2003-534959 A | 4/2000 |
| JP | 2002-26837 A | 1/2002 |
| JP | 2002-77084 A | 3/2002 |
| JP | 2002-77174 A | 3/2002 |
| JP | 2003-140804 A | 5/2003 |
| JP | 2004-80447 A | 3/2004 |
| JP | 2004-194059 A | 7/2004 |
| JP | 2004-343744 A | 12/2004 |
| JP | 2005-018230 A | 1/2005 |
| JP | 2005-045490 A | 2/2005 |
| JP | 2005-508098 A | 3/2005 |
| JP | 2005-528030 A | 9/2005 |
| JP | 2006-527540 A | 11/2006 |
| JP | 2007-195830 A | 8/2007 |
| WO | WO 99/14655 A1 | 3/1999 |
| WO | WO 99/31821 A1 | 6/1999 |
| WO | WO 00/14987 A1 | 3/2000 |
| WO | WO 02/15582 A1 | 2/2002 |
| WO | WO 02/084971 A2 | 10/2002 |
| WO | WO 03/024085 A2 | 3/2003 |
| WO | WO 03/024110 A1 | 3/2003 |
| WO | WO 03/032503 A2 | 4/2003 |
| WO | WO 03/050000 A1 | 6/2003 |
| WO | WO 03/051665 A1 | 6/2003 |
| WO | WO 2004/003696 A2 | 1/2004 |
| WO | WO 2004/008277 A2 | 1/2004 |
| WO | WO 2005/000437 A3 | 1/2005 |
| WO | WO 2005/029855 A1 | 3/2005 |
| WO | WO 2005/086865 A2 | 9/2005 |
| WO | WO 2005/120068 A3 | 12/2005 |
| WO | WO 2006/052941 A1 | 5/2006 |
| WO | WO 2006/062641 A3 | 6/2006 |
| WO | WO 2006/065381 A2 | 6/2006 |
| WO | WO 2006/077686 A1 | 7/2006 |
| WO | WO 2007/035739 A2 | 3/2007 |

OTHER PUBLICATIONS

Office Action, CN Appln No. 200780029616.X, Nov. 2, 2012.
Office Action, CN Appln No. 200780029616.X, Apr. 17, 2013.
Office Action, CN Appln No. 200880107132.7, Jul. 22, 2011.
Office Action, CN Appln No. 200880117151.8, Aug. 24, 2012.
Office Action, CN Appln No. 200880115267.8, Dec. 24, 2012.
Office Action, CN Appln No. 20080107089.4, Mar. 7, 2013.
Office Action, CN Appln No. 200880107132.7, Jun. 7, 2013.
Office Action, CN Appln No. 200880115267.8, Jul. 8, 2013.
Office Action, Appl. No. 04 754 296.4-1241, Apr. 4, 2007.
Office Action, Appl. No. 05 762 201.1-2202, May 18, 2007.
Office Action, Appl. No. 05 749 692.9-1525, Jun. 15, 2007.
Office Action, Appl. No. 06 740 274.3-2416, Jan. 31, 2008.
Office Action, Appl. No. 05 762 201.1-2202, Jul. 18, 2008.
Office Action, Appl. No. 06 740 274.3-2416, Sep. 17, 2008.
Office Action, Appl. No. 05 749 692.9-1525, Oct. 22, 2008.
Office Action, Appl. No. 06 740 274.3-2416, Mar. 20, 2009.
Office Action, Appl. No. 07 813 357 6.1523, Sep. 29, 2009.
Office Action, Appl. No. 05 749 692.9-1525, Jun. 7, 2010.
Office Action, Appl. No. 09708647.4-2415, Sep. 23, 2010.
Office Action, Appl. No. 2004-199893, Jul. 5, 2005.
Office Acton, Appl. No. 2006-000840, Mar. 6, 2007.
Office Action, JP Appl. No. 2010-527121, Jul. 12, 2012.
Office Action, JP Appl. No. 2009-523977, Jul. 17, 2012.
Office Action, JP Appl. No. 2010-525047, Dec. 25, 2012.
Office Action, JP Appl. No. 2010-525045, Mar. 5, 2013.
Office Action, JP Appl. No. 2010-525046, Mar. 5, 2013.
Office Action, JP Appl. No. 2010-528188, Mar. 26, 2013.
Office Action, JP Appl. No. 2010-527121, Apr. 2, 2013.
Office Action, JP Appl. No. 2010-525043, May 7, 2013.
Office Action, KR Appl. No. 10-2006-7036708, Sep. 26, 2011.
Int'l. Search Report, Appl. No. PCT/US2004/017666, Feb. 4, 2005.
Int'l. Search Report, Appl. No. PCT/US2005/016513, Aug. 9, 2005.
Int'l. Search Report, Appl. No. PCT/US2005/040380, Mar. 15, 2006.
Int'l. Search Report, Appl. No. PCT/US2006/012067, Aug. 9, 2006.
Int'l. Search Report, App. No. PCT/US2005/021518, Jan. 3, 2006.
Int'l. Prel. Report, Appl. No. PCT/US2005/016513, Nov. 7, 2006.
Int'l. Search Report, Appl. No. PCT/US2006/014852, Dec. 4, 2006.
Int'l. Prel. Report, Appl. No. PCT/US2005/021518, Jan. 4, 2007.
Int'l. Prel. Report, Appl. No. PCT/US2005/040380, May 18, 2007.
Int'l. Prel. Report, Appl. No. PCT/US2006/012067, Oct. 11, 2007.
Int'l. Prel. Report, Appl. No. PCT/US2006/014852, Nov. 1, 2007.
Int'l. Search Report, Appl. No. PCT/US2006/012067, Dec. 17, 2007.
Int'l. Search Report, Appl. No. PCT/US2007/075448, Jul. 4, 2008.
Int'l. Search Report, Appl. No. PCT/US2008/076294, Dec. 29, 2008.
Int'l. Search Report, Appl. No. PCT/US2008/076285, Dec. 30, 2008.
Int'l. Search Report, Appl. No. PCT/US2008/076281, Jan. 13, 2009.
Int'l. Search Report, Appl. No. PCT/US2008/078838, Jan. 16, 2009.
Int'l. Search Report, Appl. No. PCT/US2008/076290, Jan. 30, 2009.
Int'l. Prel. Report, Appl. No. PCT/US2007/074367, Feb. 5, 2009.
Int'l. Search Report, Appl. No. PCT/US2008/077562, Jun. 12, 2009.
Int'l. Search Report, Appl. No. PCT/US2009/033421, Jun. 16, 2009.
Int'l. Prel. Report, Appl. No. PCT/US2008/076281, Mar. 25, 2010.
Int'l. Prel. Report, Appl. No. PCT/US2008/076285, Mar. 25, 2010.
Int'l. Prel. Report, Appl. No. PCT/US2008/076290, Mar. 25, 2010.
Int'l. Prel. Report, Appl. No. PCT/US2008/076294, Mar. 25, 2010.
Int'l. Prel. Report, Appl. No. PCT/US2008/077562, Apr. 1, 2010.
Int'l. Prel. Report, Appl. No. PCT/US2008/078838, Apr. 15, 2010.
Int'l. Prel. Report, Appl. No. PCT/US2009/033421, Aug. 19, 2010.
Int'l Search Report, Appl. No. PCT/US2010/051231, Jun. 14, 2011.
Office Action, U.S. Appl. No. 08/071,218, Dec. 7, 1994.
Office Action, U.S. Appl. No. 08/071,218, Apr. 20, 1995.
Notice of Allowance, U.S. Appl. No. 08/071,218, Aug. 7, 1995.
Office Action, U.S. Appl. No. 08/479,654, Aug. 21, 1995.
Office Action, U.S. Appl. No. 08/362,228, Oct. 3, 1995.
Office Action, U.S. Appl. No. 08/480,666, Feb. 9, 1996.
Office Action, U.S. Appl. No. 08/479,654, Mar. 1, 1996.
Office Action, U.S. Appl. No. 08/363,228, Mar. 27, 1996.
Notice of Allowance, U.S. Appl. No. 08/363,228, Apr. 9, 1996.
Office Action, U.S. Appl. No. 08/480,666, Sep. 5, 1996.
Office Action, U.S. Appl. No. 08/480,666, Oct. 16, 1996.
Office Action, U.S. Appl. No. 08/480,666, Nov. 22, 1996.
Office Action, U.S. Appl. No. 08/479,654, Jan. 24, 1997.
Office Action, U.S. Appl. No. 08/479,654, Aug. 5, 1997.
Office Action, U.S. Appl. No. 08/863,448, Sep. 24, 1997.
Office Action, U.S. Appl. No. 08/863,448, Apr. 27, 1998.
Notice of Allowance, U.S. Appl. No. 08/863,448, Feb. 17, 1999.
Office Action, U.S. Appl. No. 09/811,317, Feb. 28, 2002.
Office Action, U.S. Appl. No. 09/811,317, Aug. 13, 2002.
Office Action, U.S. Appl. No. 09/811,317, Dec. 30, 2002.
Notice of Allowance, U.S. Appl. No. 09/811,317, Jul. 14, 2003.
Office Action, U.S. Appl. No. 09/952,629, Mar. 14, 2006.
Office Action, U.S. Appl. No. 10/773,523, Oct. 5, 2006.
Office Action, U.S. Appl. No. 09/952,629, Dec. 1, 2006.
Office Action, U.S. Appl. No. 09/952,629, Jun. 27, 2007.
Office Action, U.S. Appl. No. 09/952,629, Mar. 18, 2008.
Office Action, U.S. Appl. No. 11/086,510, Jul. 9, 2008.
Office Action, U.S. Appl. No. 11/154,749, Aug. 18, 2008.
Office Action, U.S. Appl. No. 11/269,378, Aug. 20, 2008.
Office Action, U.S. Appl. No. 09/952,629, Oct. 27, 2008.
Office Action, U.S. Appl. No. 11/123,327, Dec. 11, 2008.
Office Action, U.S. Appl. No. 11/154,749, Jan. 23, 2009.
Office Action, U.S. Appl. No. 10/772,565, Mar. 4, 2009.
Office Action, U.S. Appl. No. 11/379,360, Apr. 3, 2009.
Office Action, U.S. Appl. No. 11/277,896, Apr. 14, 2009.
Office Action, U.S. Appl. No. 11/269,378, Apr. 28, 2009.
Office Action, U.S. Appl. No. 09/952,629, Jun. 2, 2009.

(56) References Cited

OTHER PUBLICATIONS

Office Action, U.S. Appl. No. 11/123,327, Oct. 14, 2009.
Notice of Allowance, U.S. Appl. No. 11/277,896, Oct. 23, 2009.
Office Action, U.S. Appl. No. 11/154,749, Oct. 26, 2009.
Office Action, U.S. Appl. No. 11/379,360, Nov. 23, 2009.
Office Action, U.S. Appl. No. 10/772,565, Nov. 24, 2009.
Office Action, U.S. Appl. No. 11/828,193, Nov. 30, 2009.
Notice of Allowance, U.S. Appl. No. 11/269,378, Jan. 5, 2010.
Office Action, U.S. Appl. No. 11/123,327, Jan. 6, 2010.
Office Action, U.S. Appl. No. 11/154,749, Jun. 7, 2010.
Office Action, U.S. Appl. No. 10/772,565, Jul. 7, 2010.
Office Action, U.S. Appl. No. 11/123,327, Jul. 20, 2010.
Office Action, U.S. Appl. No. 11/379,360, Aug. 25, 2010.
Anonymous: "ARC-3901 Aspect Ratio Converter Modules—Installation and Operation Manual" Internet Article. [Online] Mar. 18, 2003, pp. 1-162, XP02406139, retrieved from the Internet: URL:http://www.leitch.com/custserv/doclib.nsf/disweb?OpenForm &query =ARC-3901>[retrieved on Nov. 7, 2006].

Chen, Y.F., et al., "Personalized Multimedia Services Using a Mobile Service Platform", IEEE 2002, pp. 918-925.
Ferries, Mark et al., "Optical Branching Devices for Avionic Passive Optical Network", Avionics, Fiber-Optics and Photonics Technology Conference, 2007 IEEE, IEEE, PI, Oct. 1, 2007 (Oct. 1, 2007), pp. 76-77.
Gratschew, S., et al., "A Multimedia Messaging Platform for Content Delivering", IEEE 2003, pp. 431-435.
Ibenthal, A., et al.,"Multimedia im Fahrzeug: Dienste und Technik", Fernseh und Kino-Technik 54, Jahrgang Nr. Mar. 2000, pp. 100-105.
Kartalopoulos, S.V., "Consumer Communications in the Next Generation Access Network", Consumer Communications and Networking Conference, 2004, CCNC 2004. First IEEE Las Vegas, NV, USA Jan. 5-8, 2004, Piscataway, NJ (Jan. 5, 2004), pp. 273-278.
Kirby, M., "Run Way Girl", http://www.flightglobal.com/blogs/runway-girl/2010/08/pinnacle-seat-is-bes-hottest-e.html, Aug. 2, 2010.

* cited by examiner

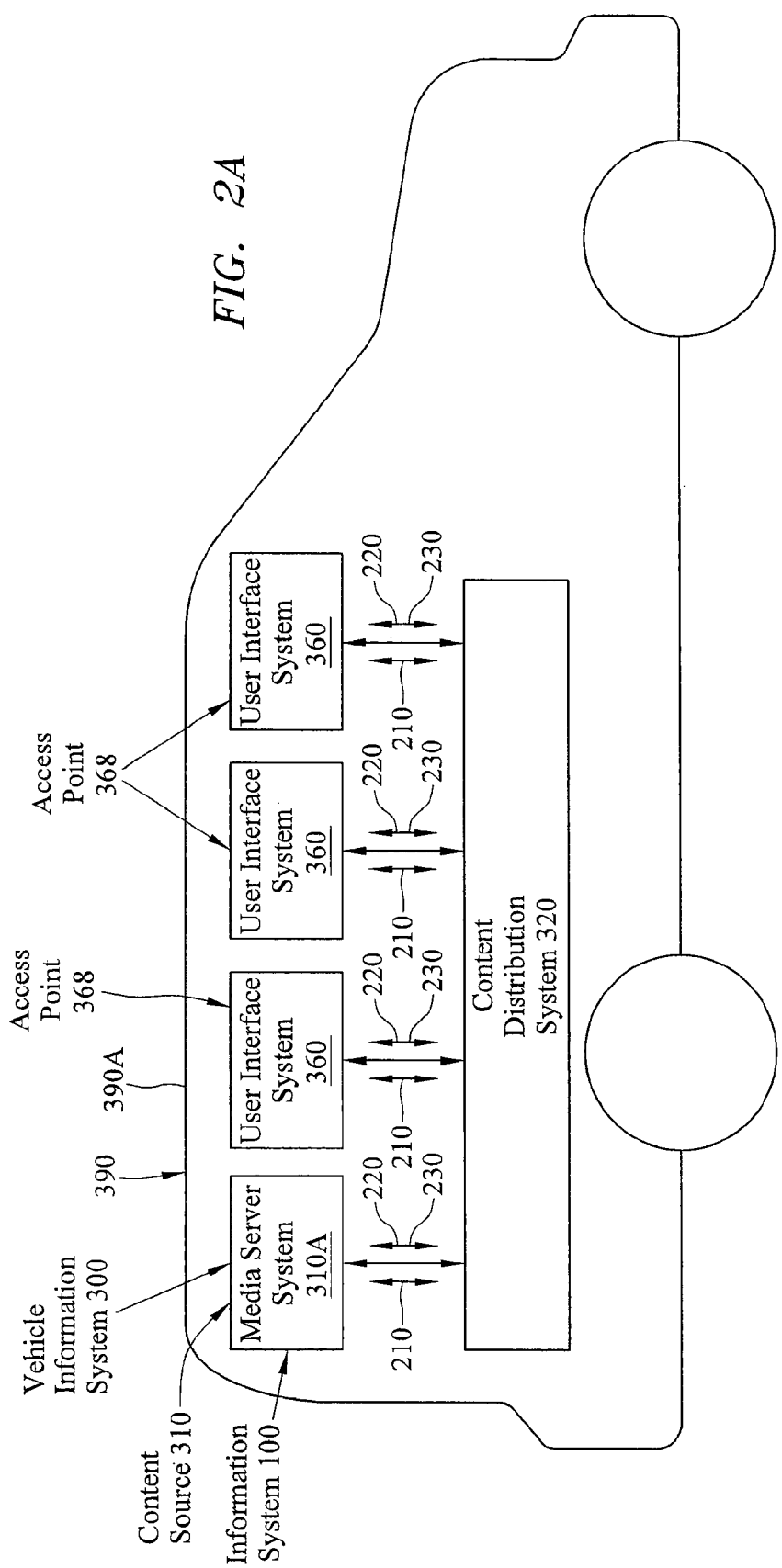

SYSTEM AND METHOD FOR RECEIVING BROADCAST CONTENT ON A MOBILE PLATFORM DURING TRAVEL

CROSS-REFERENCE TO RELATED APPLICATIONS

This application is a continuation of co-pending U.S. patent application Ser. No. 13/692,846, filed on Dec. 3, 2012, which is a continuation of U.S. patent application Ser. No. 12/237,253, filed on Sep. 24, 2008, now U.S. Pat. No. 8,326,282, which claims priority to U.S. Provisional Patent Application Ser. No. 60/974,678, filed on Sep. 24, 2007, all of which are expressly incorporated herein by reference in their entireties and for all purposes.

FIELD

The present disclosure relates generally to vehicle information systems and more particularly, but not exclusively, to aircraft in-flight entertainment systems suitable for receiving and selectably presenting viewing content broadcast from a terrestrial content source.

BACKGROUND

Vehicles, such as automobiles and aircraft, often include vehicle information systems for satisfying passenger demand for access to viewing content, such as entertainment, information content, or other viewing content, while traveling.

Conventional passenger information (or entertainment) systems typically include overhead cabin video systems or seat-based video systems with individual controls such that viewing content is selectable by the passengers. The viewing content can include audio and video content that is derived from a variety of content sources. Prerecorded viewing content, such as motion pictures and music, can be provided by internal content sources, such as audio and video players, that are installed aboard the vehicle. The conventional passenger information systems likewise can include an antenna system for receiving viewing content, such as live television programming and/or Internet content, transmitted from one or more content providers (or sources) that are external to, and/or remote from, the vehicle.

Such conventional passenger information systems, however, suffer from numerous disadvantages. Some passengers find the passenger information systems to be complicated to operate and the viewing content difficult to enjoy. Selection of the viewing content, for example, can prove difficult due to the awkward placement and operation of the user controls. Similarly, the video systems of the passenger information systems typically are located distally from the passenger controls, such as overhead and/or on an opposing seatback. In addition, some or all of the passengers traveling aboard the vehicle can be inhibited from enjoying the viewing content if one or more of the video systems fails.

Further, passenger demand for viewing content is continually evolving. Not only do passengers want to access the most current viewing content, such as live television programming and the latest games, but they also require a more extensive selection of information products and services, such as Internet access and in-transit shopping, to be available. Passengers likewise wish to view non-public (or personal) viewing content, such as viewing content available from a customer or corporate Intranet system, during travel. Conventional passenger information systems, however, are limited by their fixed hardware technology and cannot easily be adapted to accommodate changing passenger viewing content and other information preferences.

In view of the foregoing, a need exists for an improved passenger information system and method for integrating passengers' personal media devices into the passenger information system in an effort to overcome the aforementioned obstacles and deficiencies of conventional passenger information systems.

BRIEF DESCRIPTION OF THE DRAWINGS

FIG. 2A is an exemplary top-level drawing illustrating the information system of FIG. 1, wherein the information system comprises a vehicle information system installed aboard an automobile.

Figure 1:
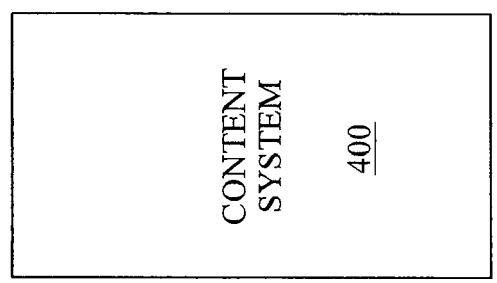
FIG. 1 is an exemplary top-level drawing illustrating an embodiment of an information system, wherein the information is in communication with a content system.
Figure 1:
Figure 1:
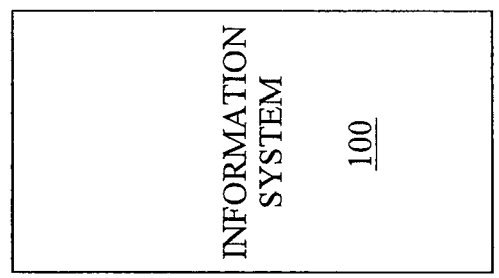

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available passenger information systems are complicated to operate, limited by fixed hardware technology, and cannot easily be adapted to accommodate changing passenger viewing content and other information preferences, an information system that communicates with at least one remote content system can prove desirable and provide a basis for a wide range of system applications, such as vehicle information systems for use aboard automobiles, aircraft, and other types of vehicles during travel. This result can be achieved, according to one embodiment disclosed herein, by an information system 100 as illustrated in FIG. 1.

Turning to FIG. 1, the information system 100 is shown as being configured to communicate with at least one content system 400. When disposed at a remote location relative to the content system 400, the information system 100 can exploit the advent of high-speed connectivity solutions, such as a broadband connectivity solution, to establish and maintain a low-cost, high-capacity data connection with the content system 400. The information system 100 thereby can be established as another node on the "Worldwide Net." The information system 100 can advantageously enhance a system user's experience, increase operational efficiency, and create a source of revenue for a system operator.

Each content system 400 can be provided in the manner set forth in the co-pending United States patent applications, entitled "SYSTEM AND METHOD FOR DOWNLOADING FILES," Ser. No. 10/772,565, filed on Feb. 4, 2004; entitled "SYSTEM AND METHOD FOR MANAGING CONTENT ON MOBILE PLATFORMS," Ser. No. 11/123,327, filed on May 6, 2005; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005; "SYSTEM AND METHOD FOR INTERFACING A PORTABLE MEDIA DEVICE WITH A VEHICLE INFORMATION SYSTEM," Ser. No. 12/210,624, filed on Sep. 15, 2008; and "PORTABLE USER CONTROL DEVICE AND METHOD FOR VEHICLE INFORMATION SYSTEMS," Ser. No. 12/210,689, filed on Sep. 15, 2008, which are assigned to the assignee of the present application and the respective disclosures of which are hereby incorporated herein by reference in their entireties.

When in communication with the content system 400, the information system 100 supports two-way communications with the content system 400. The information system 100, for example, can exchange viewing content 210 (shown in FIGS. 2A-B) with the content system 400. The viewing content 210 can include audio viewing content and/or video viewing content and can be communicated (or downloaded) from the content system 400 to the information system 100 for presentation via a video presentation system 362 (shown in FIGS. 4A-B) and/or an audio presentation system 364 (shown in FIGS. 4A-B) of the information system 100. Viewing content 210 likewise can be can be communicated (or uploaded) to the content system 400 from the information system 100, as desired.

The viewing content 210 can comprise any conventional type of audio and/or video viewing content, such as stored (or time-delayed) viewing content and/or live (or real-time) viewing content, in the manner set forth in the above-referenced co-pending United States patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005. Exemplary viewing content 210 can include television programming content, music content, podcast content, photograph album content, audiobook content, and/or movie content without limitation.

As desired, the viewing content 210 can include geographical information in the manner set forth in U.S. Pat. No. 6,661,353, entitled "METHOD FOR DISPLAYING INTERACTIVE FLIGHT MAP INFORMATION," which is assigned to the assignee of the present application and the disclosure of which is hereby incorporated herein by reference in its entirety. Alternatively, and/or additionally, to entertainment content, such as live satellite television programming and/or live satellite radio programming, the viewing content likewise can include two-way communications, such as real-time access to the Internet 310C (shown in FIG. 2B) and/or telecommunications in the manner set forth in U.S. Pat. No. 5,568,484, entitled "TELECOMMUNICATIONS SYSTEM AND METHOD FOR USE ON COMMERCIAL AIRCRAFT AND OTHER VEHICLES," which is assigned to the assignee of the present application and the disclosure of which is hereby incorporated herein by reference in its entirety. It is understood that the exemplary viewing content as shown and described herein are not exhaustive and are provided herein for purposes of illustration only and not for purposes of limitation.

Figure 2B:
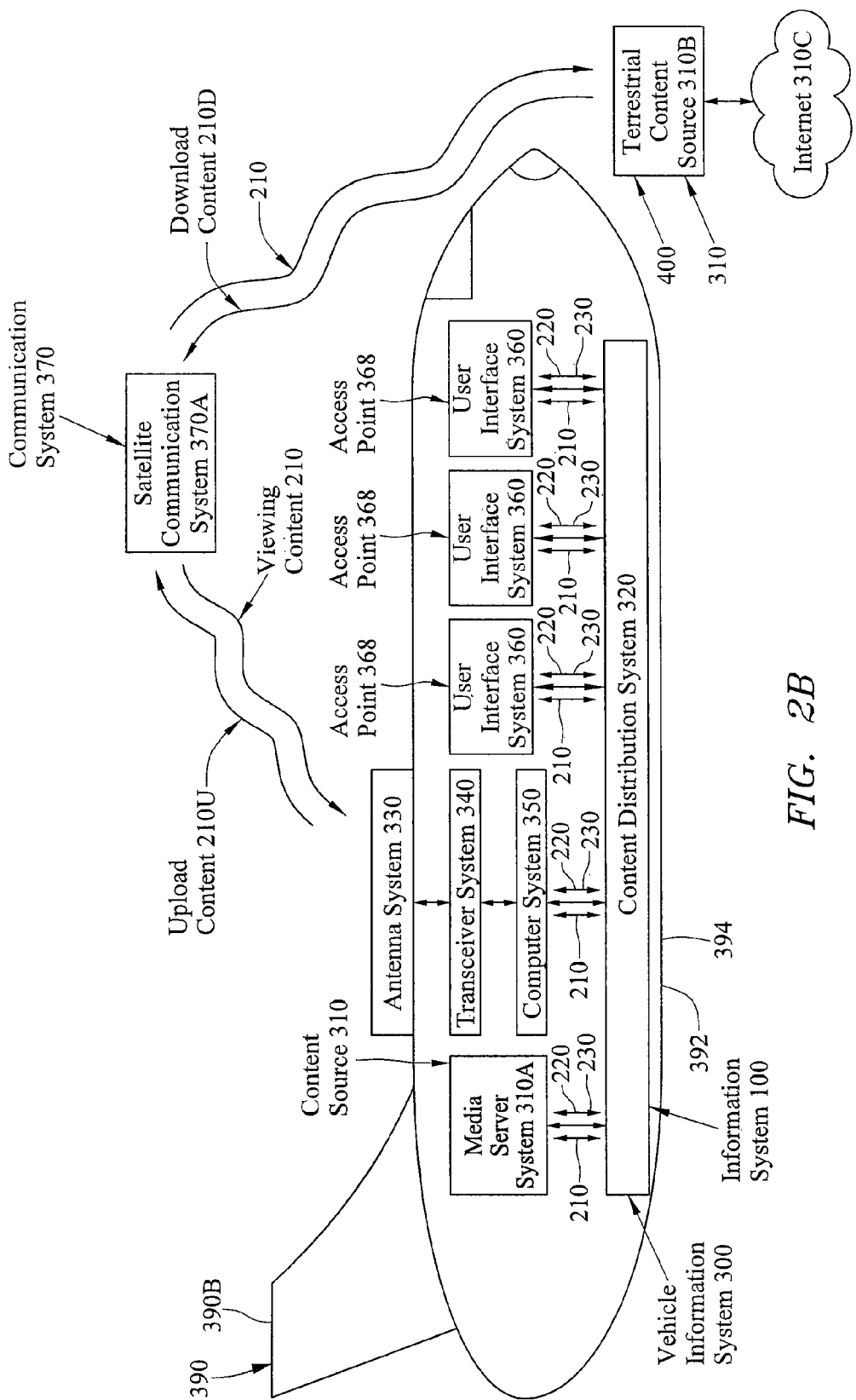
FIG. 2B is an exemplary top-level drawing illustrating the vehicle information system of FIG. 2A, wherein the vehicle information system is installed aboard an aircraft and is configured to communicate with the content system of FIG. 1.

Although the information system 100 can be disposed in a fixed location, such as a building, the information system 100 likewise can advantageously be applied in portable system applications. Turning to FIGS. 2A-B, the information system 100 is shown as comprising a vehicle information system 300 that can be configured for installation aboard a wide variety of vehicles 390. Exemplary types of vehicles can include an automobile 390A (shown in FIG. 2A), an aircraft 390B (shown in FIG. 2B), a bus, a recreational vehicle, a boat, and/or a locomotive, or any other type of passenger vehicle without limitation. If installed on an aircraft 390B as illustrated in FIG. 2B, for example, the vehicle information system 300 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif.

As shown in FIGS. 2A-B, the vehicle information system 300 comprises at least one conventional content source 310 and one or more user (or passenger) interface systems 360 that communicate via a real-time content distribution system 320. Each content source 310 can be provided in the manner set forth in the above-referenced co-pending United States patent applications "SYSTEM AND METHOD FOR DOWNLOADING FILES," Ser. No. 10/772,565, filed on Feb. 4, 2004; entitled "SYSTEM AND METHOD FOR MANAGING CONTENT ON MOBILE PLATFORMS," Ser. No. 11/123,327, filed on May 6, 2005; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005; "SYSTEM AND METHOD FOR INTERFACING A PORTABLE MEDIA DEVICE WITH A VEHICLE INFORMATION SYSTEM," Ser. No. 12/210,624, filed on Sep. 15, 2008; and "PORTABLE USER CONTROL DEVICE AND METHOD FOR VEHICLE INFORMATION SYSTEMS," Ser. No. 12/210,689, filed on Sep. 15, 2008.

The content sources 310 can include one or more internal content sources, such as server system 310A, that are installed aboard the vehicle 390 and/or remote (or terrestrial) content sources 310B that can be external from the vehicle 390. The server system 310A can be provided as an information system controller for providing overall system control functions for the vehicle information system 300 and/or at least one media (or file) server system, as illustrated in FIGS. 2A-B), for storing preprogrammed content and/or downloaded viewing content 210D, as desired. The server system 310A can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system or a hard disk drive (HDD) system, of any suitable kind, for storing the preprogrammed content and/or the downloaded viewing content 210D.

Being configured to distribute and/or present the viewing content 210 provided by one or more selected content sources 310, such as a content system 400, the vehicle information system 300 can communicate with the content sources 310 in real time and in any conventional manner, including via wired and/or wireless communications. The vehicle information system 300 and the terrestrial content source 310B, for example, can communicate in any conventional wireless manner, including directly and/or indirectly via an intermediate communication system 370, such as a satellite communication system 370A. The vehicle information system 300 thereby can receive download viewing content 210D from a selected terrestrial content source 310B and/or transmit upload viewing content 210U, including navigation and other control instructions, to the terrestrial content source 310B. As desired, the terrestrial content source 310B can be configured to communicate with other terrestrial content sources (not shown). The terrestrial content source 310B is shown in FIG. 2B as providing access to the Internet 310C. Although shown and described as comprising the satellite communication system 370A for purposes of illustration, it is understood that the communication system 370 can comprise any conventional type of wireless communication system, such as a cellular communication system (not shown) and/or an Aircraft Ground Information System (AGIS) communication system (not shown).

To facilitate communications with the terrestrial content sources 310B, the vehicle information system 300 can include an antenna system 330 and a transceiver system 340 for receiving the viewing content from the remote (or terrestrial) content sources 310B as shown in FIGS. 2A-B. The antenna system 330 preferably is disposed outside the vehicle 390, such as an exterior surface 394 of a fuselage 392 of the aircraft 390B. The antenna system 330 can receive viewing content 210 from the terrestrial content source 310B and provide the received viewing content 210, as processed by the transceiver system 340, to a computer system 350 of the vehicle information system 300. The computer system 350 can provide the received viewing content 210 to the media (or content) server system 310A and/or to one or more of the user interfaces 360, as desired. Although shown and described as being separate systems for purposes of illustration, the computer system 350 and the media server system 310A can be at least partially integrated.

Figure 3:
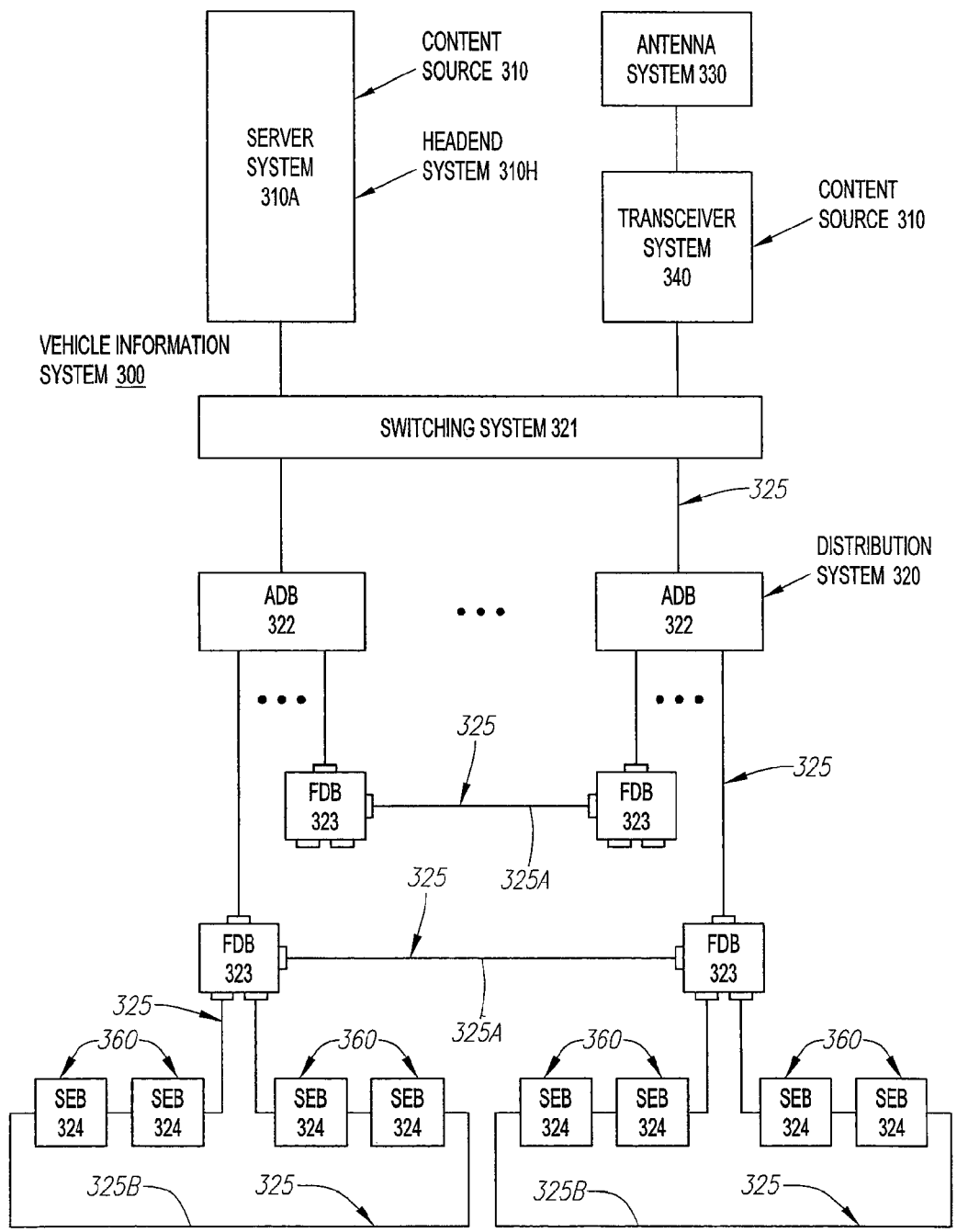
FIG. 3 is an exemplary detail drawing illustrating one preferred embodiment of a distribution system for the vehicle information systems of FIGS. 2A-B.

The vehicle information system elements, including the content sources 310 and the user interface systems 360, are shown in FIGS. 2A-B as communicating via the content distribution system 320. FIG. 3 illustrates an exemplary content distribution system 320 for the vehicle information system 300. The content distribution system 320 of FIG. 3 couples, and supports communication between a headend system 310H, which includes the content sources 310, and the plurality of user interface systems 360. The distribution system 320 as shown in FIG. 3 is provided in the manner set forth co-pending United States patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006, and in U.S. Pat. Nos. 5,596,647, 5,617,331, and 5,953,429, each entitled "INTEGRATED VIDEO AND AUDIO SIGNAL DISTRIBUTION SYSTEM AND METHOD FOR USE ON COMMERCIAL AIRCRAFT AND OTHER VEHICLES," which are assigned to the assignee of the present application and the respective disclosures of which are hereby incorporated herein by reference in their entireties.

The content distribution system 320, for example, can be provided as a conventional wired and/or wireless communication network, including a telephone network, a local area network (LAN), a wide area network (WAN), a campus area network (CAN), personal area network (PAN) and/or a wireless local area network (WLAN), of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the content distribution system 320 preferably comprises a high-speed Ethernet network, such as any type of Fast Ethernet (such as 100Base-X and/or 100Base-T) communication network and/or Gigabit (such as 1000Base-X and/or 1000Base-T) Ethernet communication network, with a typical data transfer rate of at least approximately one hundred megabits per second (100 Mbps). To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As desired, the distribution system 320 likewise can include a network management system (not shown) provided in the manner set forth in co-pending United States patent applications, entitled "SYSTEM AND METHOD FOR IMPROVING NETWORK RELIABILITY," Ser. No.

10/773,523, filed on Feb. 6, 2004, and entitled "SYSTEM AND METHOD FOR IMPROVING NETWORK RELIABILITY," Ser. No. 11/086,510, filed on Mar. 21, 2005, which are assigned to the assignee of the present application and the respective disclosures of which are hereby incorporated herein by reference in their entireties.

As illustrated in FIG. 3, the distribution system 320 can be provided as a plurality of area distribution boxes (ADBs) 322, a plurality of floor disconnect boxes (FDBs) 323, and a plurality of seat electronics boxes (SEBs) (and/or premium seat electronics boxes (PSEBs)) 324 being configured to communicate in real time via a plurality of wired and/or wireless communication connections 325. The distribution system 320 likewise can include a switching system 321 for providing an interface between the distribution system 320 and the headend system 310H. The switching system 321 can comprise a conventional switching system, such as an Ethernet switching system, and is configured to couple the headend system 310H with the area distribution boxes 322. Each of the area distribution boxes 322 is coupled with, and communicates with, the switching system 321.

Each of the area distribution boxes 322, in turn, is coupled with, and communicates with, at least one floor disconnect box 323. Although the area distribution boxes 322 and the associated floor disconnect boxes 323 can be coupled in any conventional configuration, the associated floor disconnect boxes 323 preferably are disposed in a star network topology about a central area distribution box 322 as illustrated in FIG. 3. Each floor disconnect box 323 is coupled with, and services, a plurality of daisy-chains of seat electronics boxes 324. The seat electronics boxes 324, in turn, are configured to communicate with the user interface systems 360. Each seat electronics box 324 can support one or more of the user interface systems 360.

The switching systems 321, the area distribution boxes (ADBs) 322, the floor disconnect boxes (FDBs) 323, the seat electronics boxes (SEBs) (and/or premium seat electronics boxes (PSEBs)) 324, and other system resources of the content distribution system 320 preferably are provided as line replaceable units (LRUs) (not shown). Exemplary other system resources of the content distribution system 320 can include a broadband antenna system 512, a broadband control system 514 (shown in FIG. 6), a wireless access point 368 (shown in FIG. 6), a crew terminal (or panel) 524 (shown in FIGS. 7A-C), an aircraft interface system 522 (shown in FIG. 6), and/or a system controller 530 (shown in FIG. 7B). The use of LRUs facilitate maintenance of the vehicle information system 300 because a defective LRU can simply be removed from the vehicle information system 300 and replaced with a new (or different) LRU. The defective LRU thereafter can be repaired for subsequent installation. Advantageously, the use of LRUs can promote flexibility in configuring the content distribution system 320 by permitting ready modification of the number, arrangement, and/or configuration of the system resources of the content distribution system 320. The content distribution system 320 likewise can be readily upgraded by replacing any obsolete LRUs with new LRUs.

As desired, the floor disconnect boxes 323 advantageously can be provided as routing systems and/or interconnected in the manner set forth in the above-referenced co-pending United States patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006. The distribution system 320 can include at least one FDB internal port bypass connection 325A and/or at least one SEB loopback connection 325B. Each FDB internal port bypass connection 325A is a communication connection 325 that permits floor disconnect boxes 323 associated with different area distribution boxes 322 to directly communicate. Each SEB loopback connection 325B is a communication connection 325 that directly couples the last seat electronics box 324 in each daisy-chain of seat electronics boxes 324 for a selected floor disconnect box 323 as shown in FIG. 3. Each SEB loopback connection 325B therefore forms a loopback path among the daisy-chained seat electronics boxes 324 coupled with the relevant floor disconnect box 323.

Returning to FIGS. 2A-B, the user interface systems 360 are provided for selecting viewing content 210 and for presenting the selected viewing content 210. As desired, the user interface systems 360 can comprise conventional passenger interfaces and can be provided in the manner set forth in the above-referenced co-pending United States patent application, entitled "PORTABLE MEDIA DEVICE AND METHOD FOR PRESENTING VIEWING CONTENT DURING TRAVEL," Ser. No. 11/154,749, filed on Jun. 15, 2005, as well as in the manner set forth in United States patent application, entitled "SYSTEM AND METHOD FOR PRESENTING HIGH-QUALITY VIDEO," Ser. No. 11/379,360, filed on Apr. 19, 2006, now abandoned, the disclosure of which is hereby incorporated herein by reference in its entirety.

Figure 4A:
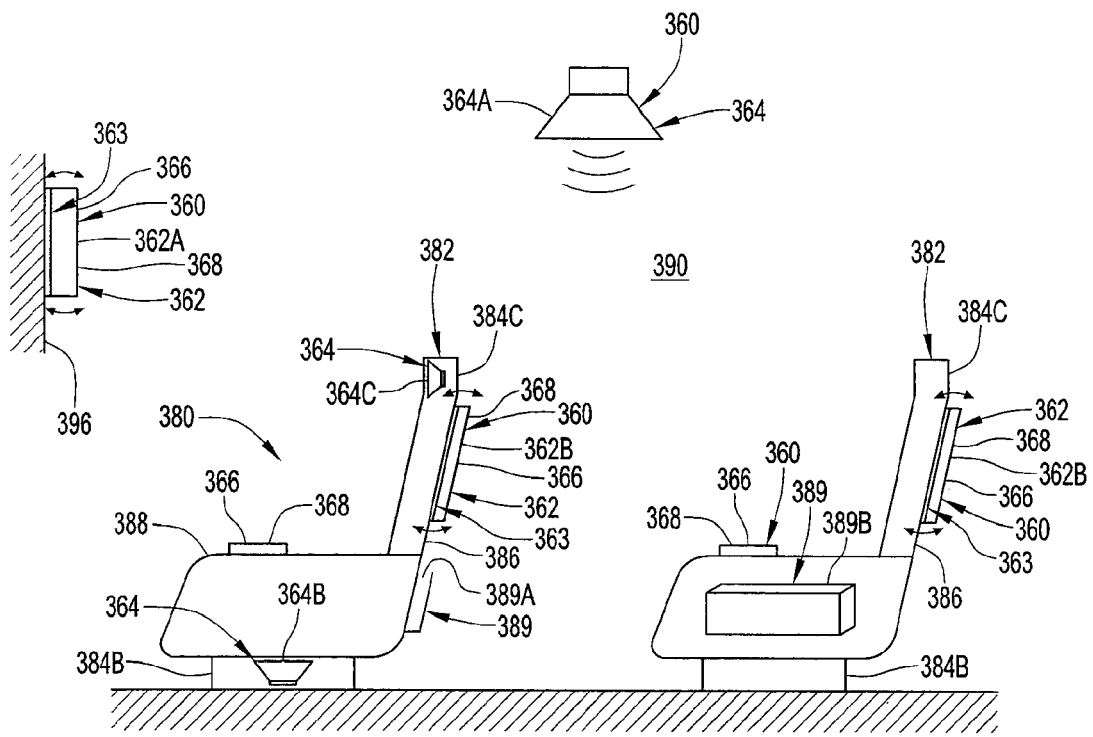
FIG. 4A is an exemplary top-level drawing illustrating a passenger cabin of a vehicle, wherein the vehicle information system of FIGS. 2A-B has been installed.

FIG. 4A provides a view of a passenger cabin 380 of a passenger vehicle 390, such as the automobile 390A (shown in FIG. 2A) and/or the aircraft 390B (shown in FIG. 2B), aboard which the vehicle information system 300 has been installed. The passenger cabin 380 is illustrated as including a plurality of passenger seats 382, and each passenger seat 382 is associated with a selected user interface system 360. Each user interface system 360 can include a video interface system 362 and/or an audio interface system 364. Exemplary video interface systems 362 can include overhead cabin display systems 362A with central controls, seatback display systems 362B or armrest display systems (not shown) each with individualized controls, crew display panels, and/or handheld presentation systems. The audio interface systems 364 can be provided in any conventional manner, including an overhead speaker system 364A, the handheld presentation systems, and/or headphones coupled with an audio jack provided, for example, at an armrest 388 of the passenger seat 382. A speaker system likewise can be associated with the passenger seat 382, such as a speaker system 364B disposed within a base 384B of the passenger seat 382 and/or a speaker system 364C disposed within a headrest 384C of the passenger seat 382. In a preferred embodiment, the audio interface system 364 can include an optional noise-cancellation system for further improving sound quality produced by the audio interface system 364.

The video interface systems 362 and the audio interface systems 364 can be installed at any suitable cabin surface, such as a seatback 386, wall 396, ceiling, and/or bulkhead, or an armrest 388 of a passenger seat 382 in any conventional manner including via a mounting system 363 provided in the manner set forth co-pending United States patent applications, entitled "SYSTEM AND METHOD FOR MOUNTING USER INTERFACE DEVICES," Ser. No. 11/828,193, filed on Jul. 25, 2007, and entitled "USER INTERFACE DEVICE AND METHOD FOR PRESENTING VIEWING CONTENT," Ser. No. 11/835,371, filed on Aug. 7, 2007, which are assigned to the assignee of the present application and the respective disclosures of which are hereby incorporated herein by reference in their entireties.

As shown in FIG. 4A, the user interface system 360 likewise can include an input system 366 for permitting the user (or passenger) to communicate with the vehicle information system 300, such as via an exchange of control signals 220. For example, the input system 366 can permit the user to enter one or more user instructions 230 for controlling the operation of the vehicle information system 300. Illustrative user instructions 230 can include instructions for initiating communication with the content source 310, instructions for selecting viewing content 210 for presentation, and/or instructions for controlling the presentation of the selected viewing content 210. If a fee is required for accessing the viewing content 210, payment information likewise can be entered via the input system 366.

The input system 366 can be provided in any conventional manner and typically includes one or more switches (or pushbuttons), such as a keyboard or a keypad, and/or a pointing device, such as a mouse, trackball, or stylus. As desired, the input system 366 can be at least partially integrated with, and/or separable from, the associated video interface system 362 and/or audio interface system 364. For example, the video interface system 362 and the input system 366 can be provided as a touchscreen display system. The input system 366 likewise can include one or more input ports (not shown) for coupling a peripheral input device (not shown), such as a full-size computer keyboard, an external mouse, and/or a game pad, with the vehicle information system 300.

Preferably, at least one of the user interface systems 360 includes a wired and/or wireless access point 368, such as a conventional communication port (or connector), for coupling a personal media device 200 (shown in FIG. 4B) with the vehicle information system 300. Passengers (not shown) who are traveling aboard the vehicle 390 thereby can enjoy personally-selected viewing content during travel. The access point 368 is located proximally to an associated passenger seat 382 and can be provided at any suitable cabin surface, such as a seatback 386, wall 396, ceiling, and/or bulkhead.

Figure 4B:
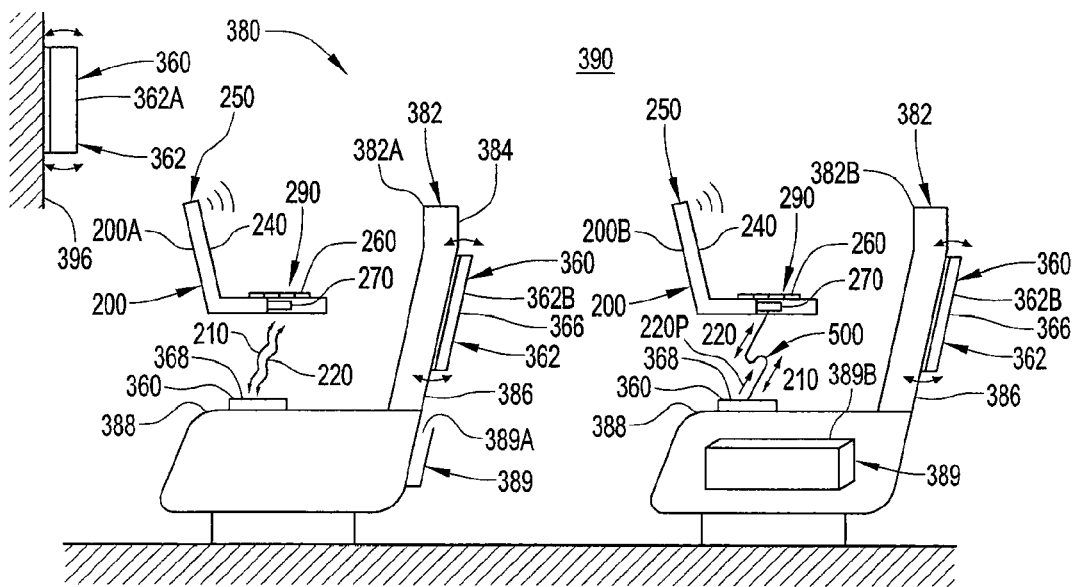
FIG. 4B is an exemplary top-level drawing illustrating an embodiment of the vehicle information system of FIG. 4A, wherein the vehicle information system is in communication with the personal media device of FIG. 1.

Turning to FIG. 4B, the vehicle information system 300 is shown as communicating with one or more personal media devices 200. Each personal media device 200 can store the audio and/or video viewing content 210 and can be provided as a handheld device, such as a laptop computer, a palmtop computer, a personal digital assistant (PDA), cellular telephone, an iPod® digital electronic media device, an iPhone® digital electronic media device, and/or a MPEG Audio Layer 3 (MP3) device. Illustrative personal media devices 200 are shown and described in the co-pending United States patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005; "SYSTEM AND METHOD FOR INTERFACING A PORTABLE MEDIA DEVICE WITH A VEHICLE INFORMATION SYSTEM," Ser. No. 12/210,624, filed on Sep. 15, 2008; "MEDIA DEVICE INTERFACE SYSTEM AND METHOD FOR VEHICLE INFORMATION SYSTEMS," Ser. No. 12/210,636, filed on Sep. 15, 2008; "MEDIA DEVICE INTERFACE SYSTEM AND METHOD FOR VEHICLE INFORMATION SYSTEMS," Ser. No. 12/210,652, filed on Sep. 15, 2008; and "PORTABLE USER CONTROL DEVICE AND METHOD FOR VEHICLE INFORMATION SYSTEMS," Ser. No. 12/210,689, filed on Sep. 15, 2008, which are assigned to the assignee of the present application and the respective disclosures of which are hereby incorporated herein by reference in their entireties.

The illustrated personal media devices 200 each include a video display system 240 for visually presenting the viewing content 210 and an audio system 250 for audibly presenting the viewing content 210. Each personal media device 200 can include a user control system 260, which can be provided in any conventional manner and typically includes one or more switches (or pushbuttons), such as a keyboard or a keypad, and/or a pointing device, such as a mouse, trackball, or stylus. The personal media devices 200 thereby can select desired viewing content 210 and control the manner in which the selected viewing content 210 is received and/or presented.

The personal media devices 200 likewise include a communication port (or connector) 270. The communication port 270 enables the personal media devices 200 to communicate with the vehicle information system 300 via the access points 368 of the user interface systems 360. As illustrated with personal media device 200A, the communication port 270 and the access points 368 can supported wireless communications; whereas, support for wired communications between the communication port 270 and the access points 368 via a communication cable assembly 500 is shown with personal media device 200B. When the communication port 270 and the access points 368 are in communication, the vehicle information system 300 supports a simple manner for permitting the associated personal media device 200 to be integrated with the vehicle information system 300 using a user-friendly communication interface.

When the personal media device 200 and the vehicle information system 300 are in communication, the vehicle information system 300 can perform a plurality of integration tasks simultaneously, enabling the personal media device 200 to become fully integrated with the vehicle information system 300 via a selected access point 368. The system elements of the vehicle information system 300 and the personal media device 200 thereby become interchangeable. The personal media device 200 likewise can receive control signals (or commands) 220 and/or operating power 220P from the vehicle information system 300. Thereby, the personal media device 200 advantageously can become a seamless part of the vehicle information system 300.

For example, user instructions 230 (shown in FIGS. 2A-B) for controlling the operation of the vehicle information system 300 can be provided via the input system 366 of the vehicle information system 300 and/or the user control system 260 of the personal media device 200. In other words, the input system 366 of the vehicle information system 300 and/or the user control system 260 of the personal media device 200 can be used to select viewing content 210 and control the manner in which the selected viewing content 210 is received and/or presented. The selected viewing content 210 can be provided by a relevant content source 310 (shown in FIGS. 2A-B) of the vehicle information system 300 and/or by storage media (not shown) disposed within the personal media device 200. A video portion of the selected viewing content 210 thereby can be presented via the video presentation system 362 of the vehicle information system 300 and/or the video display system 240 of the personal media device 200. The audio presentation system 364 of the vehicle information system 300 and/or the audio system 250 of the personal media device 200 can be used to present an audio portion of the selected viewing content 210. If the video display system 240 of the personal media device 200 is much smaller than the video presentation system 362 of the vehicle information system 300, a passenger may prefer to view the selected viewing content 210 via the larger video presentation system 362.

When no longer in use and/or direct physical contact with the personal media device 200 is not otherwise required, the personal media device 200 can be stored at the passenger seat 382. For example, the passenger seat 382 can include a storage compartment 389 for providing storage of the personal media device 200. The storage compartment 389 can be provided in any conventional manner and at any suitable portion of the passenger seat 382. As illustrated with passenger seat 382B, the personal media device 200 can be placed in a storage pocket 389B formed in the armrest 388 of the passenger seat 382B. The storage compartment 389 likewise can be provided on the seatback 386 and/or the headrest 384 of the passenger seat 382. Storage compartment 389A of passenger seat 382A, for example, is shown as being formed on the lower seatback 386 of the passenger seat 382A. As desired, the storage compartment 389 can comprise an overhead storage compartment, a door storage compartment, a storage compartment provided underneath the passenger seat 382, or any other type of conventional storage compartment, such as a glove compartment, trunk, or closet, available in the passenger vehicle 390.

Figure 5:
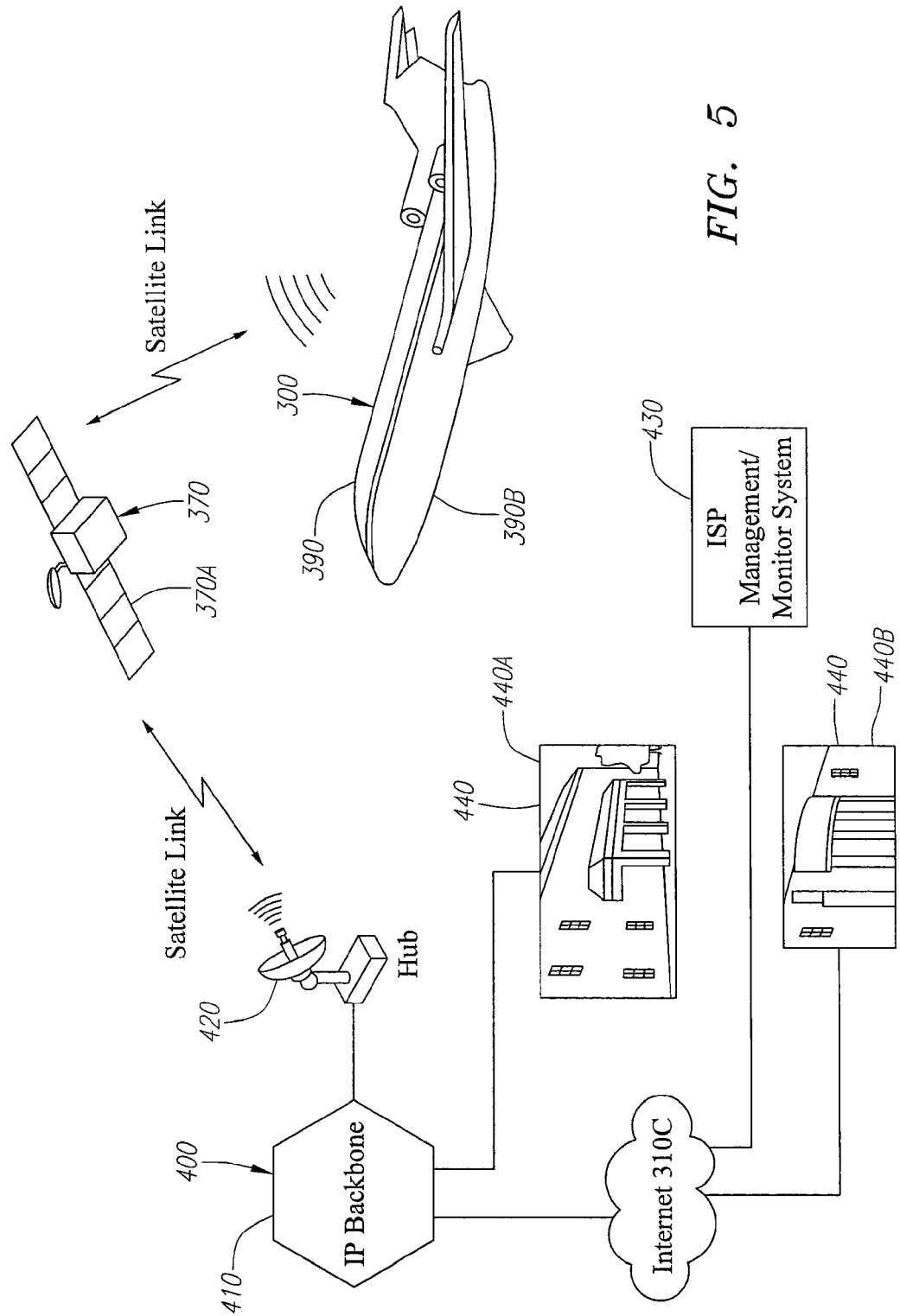
FIG. 5 is an exemplary top-level drawing illustrating an embodiment of the content system of FIG. 1.

Turning to FIG. 5, the vehicle information system 300 is shown as being disposed in an aircraft 390B and as being in communication with an exemplary content system 400. The vehicle information system 300 and the content system 400 communicate via the satellite communication system 370A. The content system 400 includes an Internet Protocol (IP) backbone system 410. An exemplary IP backbone system 410 is the IP backbone system as manufactured by Intelsat, Ltd., of Pembroke, Bermuda. The IP backbone system 410 is coupled with a satellite transceiver hub system 420. The satellite transceiver hub system 420 preferably comprises a conventional satellite transceiver hub that provides a satellite link with the satellite communication system 370A.

The content system 400 is shown as including at least one network operations center (NOC) 440. The network operations center 440A, for example, comprises a physical and logical hub for the content system 400. Providing fully managed network services, the network operations center 440 forms a gateway to the Internet 310C and other public telecommunication networks that can communicate with off-network destinations, such as an Internet Service Provider (ISP) management (or monitoring) system 430. The content system 400 likewise can include a network operations center 440B that manages (or monitors) selected operating parameters, such as operating mode and/or usage, of the vehicle information system 300.

The network operations center 440 advantageously centralizes monitoring and operations of the vehicle information system 300. Thereby, the vehicle information system elements of the vehicle information system 300 can be readily reconfigured in response to failures, outages, performance bottlenecks, loading balance objectives, and other network control requirements. The network operations center 440 likewise can provide for operator monitoring of radio frequency (RF) return link status, frequency, data rate assignments, and power levels on a per-mobile platform basis. As desired, the network operations center 440 can provide for operator monitoring of aggregate equivalent (or effective) isotropically radiated power (EIRP) spectral density relative to regulatory interference limits for each return link transponder. The network operations center 440, when necessary, can provide notifications and enable operator inputs to support manual operator control of radio frequency (RF) return link transmission parameters, and manual termination of return link transmissions. The network operations center 440 also can calculate the bandwidth demanded, reports to the service provider, and re-configures the satellite linking bandwidth.

When in communication with the content system 400, the vehicle information system 300 can exploit the advent of high-speed connectivity solutions, such as a broadband connectivity solution, to establish and maintain a low-cost, high-capacity data connection with the content system 400. The vehicle information system 300 thereby can support bidirectional communications with functionality associated with the content system 400 to provide enhanced information, entertainment, and communication services (or functionality). Exemplary functionality of the content system 400 can include on-board access to in-transit shopping, the Internet 310C, electronic mail (or email), corporate virtual private networks (VPNs), customer virtual private networks (VPNs), and/or other sources of non-public (or personal) viewing content, such as a customer or corporate Intranet system. The vehicle information system 300 thereby can be established as another node on the "Worldwide Net" and can advantageously enhance a system user's experience, increase operational efficiency, and/or create a source of revenue for the aircraft operator.

Figure 6:
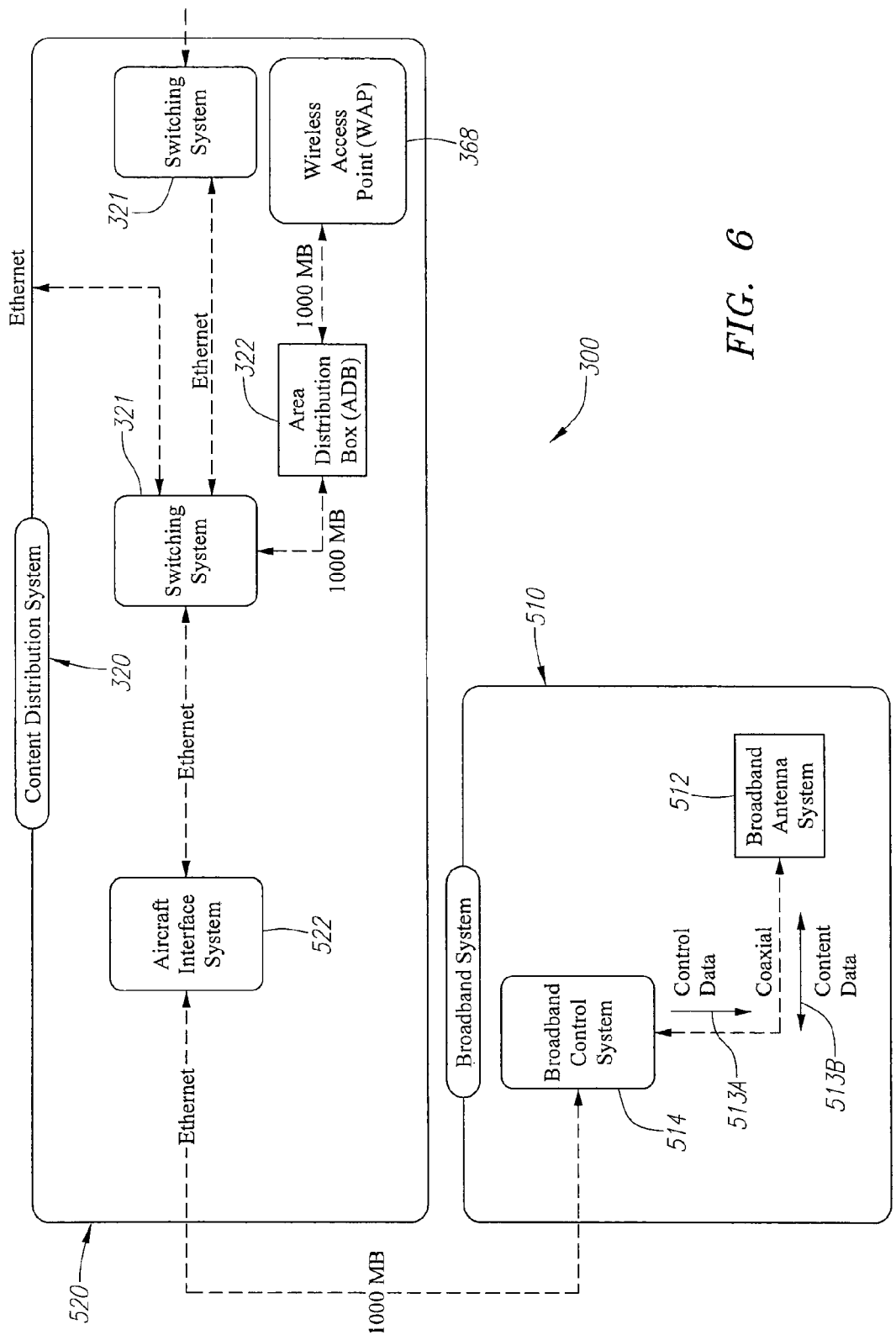
FIG. 6 is an exemplary detail drawing illustrating an embodiment of the vehicle information system of FIGS. 2A-B, wherein the vehicle information system includes a broadband system for supporting broadband communications with the content system of FIG. 1.

FIG. 6 shows a preferred embodiment of the vehicle information system 300, wherein the vehicle information system 300 includes a broadband communication system 510 for supporting broadband communications with the content system 400 (shown in FIG. 1). The broadband communication system 510 is illustrated as including a broadband antenna system 512 and a broadband control system 514. Preferably being disposed under, and protected by, a radome, the broadband antenna system 512 can be provided in the manner set forth above with reference to the antenna system 330 (shown in FIG. 2B) and operates under control of the broadband control system 514. Exemplary antenna systems and control systems are shown and described in set forth in the above-referenced co-pending United States patent application, entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005. An exemplary broadband antenna system is the MiJet broadband antenna system as manufactured by Starling Advanced Communications Ltd., of Yoqneam, Israel, which has been acquired by Panasonic Avionics Corporation of Lake Forest, Calif. The vehicle information system 300 thereby can support a broadband network load of approximately 18 Mbits/s for downstream traffic and 4.2 Mbits/s for upstream traffic.

The broadband control system 514 can include a conventional satellite modem system (not shown) and/or a media server system that is provided in the manner set forth above with reference to the media server system 310A (shown in FIGS. 2A-B). Being in communication with the broadband antenna system 512, the broadband control system 514 can provide control data signals 513A to the broadband antenna system 512. The broadband control system 514 thereby can direct the broadband antenna system 512 toward a selected satellite communication system 370A (shown in FIG. 2B) such that the vehicle information system 300 can communicate with the satellite communication system 370A and, thereby, a relevant content system 400 (shown in FIG. 1). When in communication with the content system 400, the vehicle information system 300 can exchange content data signals 513B with the content system 400 via the satellite communication system 370A. In other words, the broadband control system 514 provides a broadband connection to and from the satellite communication system 370A.

As illustrated in FIG. 6, the broadband control system 514 can communicate with the content distribution system 320 of the vehicle information system 300. If the content distribution system 320 supports Gigabit (such as 1000Base-X and/or 1000Base-T) Ethernet communications in the manner discussed above, the broadband control system 514 can communicate with the content distribution system 320 via a Gigabit Ethernet communication connection as shown in FIG. 6. As desired, the broadband control system 514 and the content distribution system 320 can communicate directly and/or indirectly via, for example, an aircraft interface system 522 as illustrated in FIG. 6. The aircraft interface system 522 for aircraft 390B with a wide-body configuration and/or a system controller 530 (shown FIG. 7B) for aircraft 390B with a narrow-body configuration can be coupled with the content distribution system 320 and provide an interface for providing selected aircraft and other avionics information, such as Aeronautical Radio Incorporated (ARINC) Standard 429 signaling, Ethernet signaling, discrete input/output keylines, public address audio, flight mapping data, to the vehicle information system 300. The aircraft interface system 522 and/or the system controller 530 thereby can serve as a gateway between aircraft avionics equipment (not shown) and the vehicle information system 300.

In operation, the broadband feed of viewing content 210 (shown in FIG. 4B) is beamed from the satellite communication system 370A to the broadband antenna system 512. Upon receiving the downloaded viewing content 210D (shown in FIG. 4B), the broadband antenna system 512 can provide the received viewing content 210 to the broadband control system 514. As desired, the broadband antenna system 512 can preprocess the received viewing content 210 in any conventional manner and provide the preprocessed viewing content 210 to the broadband control system 514. Illustrative preprocessing operations can include amplification and/or down-conversion of the received viewing content 210 without limitation. In a preferred embodiment the received viewing content 210 is received as a pair of high-frequency signals within the Ku-Band (10.7 GHz-12.75 GHz) and are downconverted into a pair of intermediate-frequency (or low-frequency) signals within a predetermined intermediate-frequency (or low-frequency) band, such as the L-Band (950 MHz-2150 MHz).

The broadband antenna system 512 thereby can convert the received viewing content 210 into the preprocessed viewing content 210 that is suitable for distribution throughout the vehicle information system 300 without significant cable loss and/or signal degradation. The broadband control system 514 can receive the viewing content 210, including the received viewing content and/or the preprocessed viewing content 210, from the broadband antenna system 512 and can demodulate the viewing content 210. Upon demodulating the viewing content 210, the broadband control system 514 can provide the demodulated viewing content 210 to the content distribution system 320 for distribution throughout the vehicle information system 300. The demodulated viewing content 210 thereby can be presented via the video presentation systems 362 (shown in FIGS. 4A-B) and/or the audio presentation systems 364 (shown in FIGS. 4A-B) of the vehicle information system 300. As desired, the content distribution system 320 can include one or more access point 368, such as the wireless access point (WAP) shown in FIG. 6, for communicating with personal (or portable) media devices 200 (shown in FIG. 4B). The demodulated viewing content 210 thereby can be presented via the video display system (shown in FIG. 4B) and/or the audio system 250 (shown in FIG. 4B) of the personal media devices 200.

As desired, the above process can be reversed to transmit uploaded viewing content 210U (shown in FIG. 4B) from the vehicle information system 300 to the satellite communication system 370A via the broadband antenna system 512. Instructions for navigating viewing content available on the content system 400, for example, can be entered via the input system 366 (shown in FIGS. 4A-B) of the vehicle information system 300 and/or the user control system 260 (shown in FIG. 4B) of the personal media device 200. The navigation instructions can be entered in any conventional manner such as via a menu system presented on a touch-screen display system. Illustrative manners for entering the navigation instructions are shown and described in the above-referenced co-pending United States patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005; "SYSTEM AND METHOD FOR INTERFACING A PORTABLE MEDIA DEVICE WITH A VEHICLE INFORMATION SYSTEM," Ser. No. 12/210,624, filed on Sep. 15, 2008; and "PORTABLE USER CONTROL DEVICE AND METHOD FOR VEHICLE INFORMATION SYSTEMS," Ser. No. 12/210,689, filed on Sep. 15, 2008.

The content distribution system 320 preferably provides broadband Ethernet network connectivity between the headend system 310H (shown in FIG. 3) and the user interface systems 360, the access points 368, and/or the personal media devices 200. If provided as wireless access points (WAPs), for example, the wireless access points 368 can provide broadband wireless access for the personal media devices 200 by transmitting and/or receiving broadband radio frequency communication signals (not shown). To support broadband Ethernet network connectivity throughout the distribution system 320, the switching system 321 can provide high-speed 10/100/1000 Base-SX/T Ethernet communications among the vehicle information system elements of the vehicle information system 300. The vehicle information system 300 thereby can provide user (or passenger) access to the Internet 310C and other audio and/or video viewing content 210. The area distribution boxes (ADBs) 322 (shown in FIGS. 3 and 7A-C) can serve as network hubs and can enable the seat electronics boxes (SEBs) (and/or premium seat electronics boxes (PSEBs)) 324 (shown in FIGS. 3 and 7B-C) to connect to the distribution system 320. As desired, the distribution system 320 can support Internet protocol (IP), Spanning Tree Protocol, and/or Quality of Service.

The vehicle information system elements of the vehicle information system 300 preferably are serially connected by two balanced and twisted pair wires (not shown). Each vehicle information system element can be connected to a shared signaling system. The Ethernet signals are transmitted serially, one bit at a time, over the shared signal channel to each vehicle information system element. To send data, a selected vehicle information system element listens to the channel, and, when the channel is idle, the vehicle information system element transmits data in the form of an Ethernet frame or packets, thereby preventing data collisions on the data bus. If the channel is busy, the vehicle information system element continues to listen until the channel is idle.

After each frame transmission, each vehicle information system element on the distribution system 320 can contend equally for the next frame transmission opportunity. Access to the network channel thereby can be equal such that no single vehicle information system element can lock out the other vehicle information system elements. The Ethernet data frame preferably comprises of a set of bits organized into several fields. These fields include address fields, a variable size data field that carries from 46 to 1,500 bytes of data, and an error checking field that checks the integrity of the bits in the frame to make sure that the frame has arrived intact. The first two fields in the frame carry 48-bit addresses, called the destination and source addresses. All units connected on the network look at the destination address. The vehicle information system element with the same address as the destination address in the frame will read in the entire frames. Other vehicle information system elements can stop reading the frame when the destination address does not match their own address.

The Ethernet distribution system 320 provides communication between the vehicle information system elements. Internet data, media contents, application codes, database, and built-in test equipment (BITE) commands can be sent from a crew terminal (or panel) 524 (shown in FIGS. 7A-C) and/or a file server system 528 (shown in FIGS. 7A-C) to the seat electronics boxes (SEBs) (and/or premium seat electronics boxes (PSEBs)) 324 (shown in FIGS. 3 and 7B-C) and/or a wireless zone terminator through a wireless portion of the distribution system 320. The seat equipment can also send program request, BITE status, and passenger service data back to the headend system 310H via the Ethernet distribution system 320.

As desired, the distribution system 320 can include a fiber gigabit Ethernet portion that conforms to Institute of Electrical and Electronics Engineers (IEEE) Standard 802.3z. The fiber optic connection can be 62.5/125 µm multi mode fiber with a 850 nm wavelength. The resultant data rate thereby can be 1 Gbits/s. If the distribution system 320 is provided with one or more copper Ethernet connections, the copper Ethernet connections preferably conform to Institute of Electrical and Electronics Engineers (IEEE) Standard 802.3. The resultant data rate can be 10/100/1000 Mbits/s. The copper connections for 10/100 Base-T copper Ethernet can include Category 5E (or equivalent) cables in accordance with American National Standards Institute Standard TIA/EIA-568-B; whereas, the copper connections for 1000 Base-T copper Ethernet can include Category 6 (or equivalent) cables in accordance with American National Standards Institute Standard TIA/EIA-568-B.

Figure 7A:
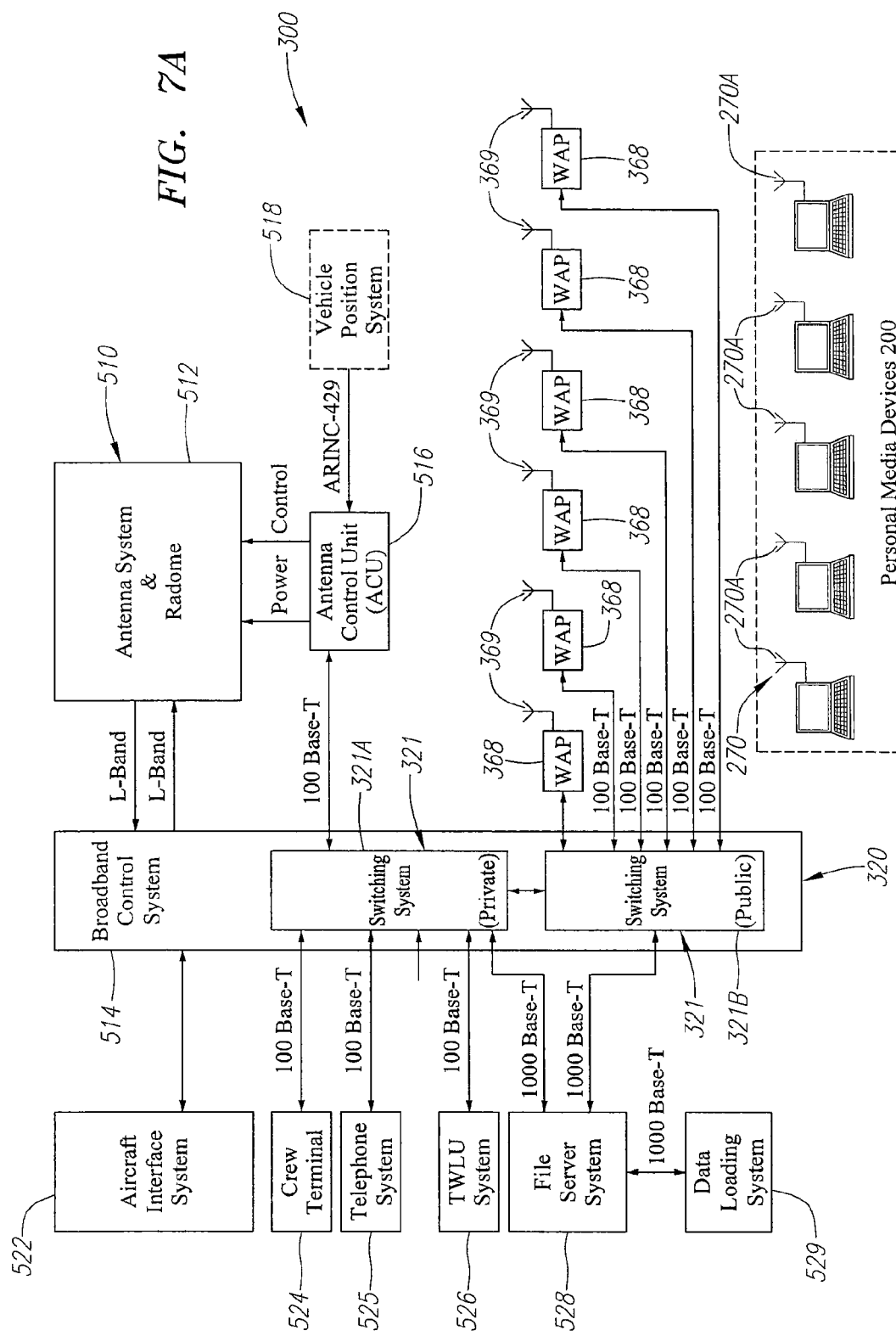
FIG. 7A is an exemplary detail drawing illustrating an embodiment of the vehicle information system of FIG. 6, wherein the vehicle information system is suitable for use as a stand-alone system.

Selected embodiments of the vehicle information system 300 are shown and described with reference to FIGS. 7A-C. Turning to FIG. 7A, the vehicle information system 300 is shown as being suitable for use as a stand-alone system. The broadband communication system 510 of the vehicle information system 300 can include an antenna control unit (ACU) 516 for tracking communication signals from the satellite communication system 370A (shown in FIG. 2B) and providing alignment data to the broadband antenna system 512. The antenna control unit 516 thereby can initiate and/or maintain communication between the broadband antenna system 512 and the satellite communication system 370A (shown in FIG. 2B).

The antenna control system 516 can comprise any conventional type of antenna controller and can direct the broadband antenna system 512 toward the satellite communication system 370A in any suitable manner. Exemplary manners for initiating and/or maintaining communication between the broadband antenna system 512 and the satellite communication system 370A are shown and described in the above-referenced co-pending United States patent application, entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005. As illustrated in FIG. 7A, vehicle position data can be provided by a vehicle position system 518, such as a Global Positioning Satellite (GPS) system and/or an Inertial Reference System (IRS).

The antenna control system 516 can track the satellite communication system 370A and maintain the connectivity with the land-based satellite transceiver hub system 420 (shown in FIG. 5) over the satellite communication system 370A. As needed, the antenna control system 516 can automatically find and switch to another suitable satellite beam when the vehicle 390 travels outside the area covered by the currently used satellite beam. The antenna control system 516 can automatically re-establish connectivity when satellite service is interrupted for any reason and the cause of interruption is rectified. The antenna control system 516 likewise can restore Internet protocol (IP) connectivity to the vehicle 390 after establishing the connection to the new beam. The content system 400 preferably supports beam switching to coordinate the vehicle information system 300 re-establishing the connectivity. Advance notice preferably is provided to the system applications of the vehicle information system 300 to allow the vehicle information system 300 adjust the performance parameters accordantly, such as VPN reconnect, audio/video streaming buffer, credit card verification buffer, etc.

The broadband control system 514 provides a broadband communication connection (or link) between the vehicle information system 300 and the satellite communication system 370A (shown in FIG. 2B) and is illustrated as including at least one switching system 321. The switching system 321 of the broadband control system 514 can be provided in the manner discussed above with reference to FIG. 3 and can include a private switching system 321A and/or a public switching system 321B. Segmenting the switching system 321 into the private switching system 321A and the public switching system 321B helps to prevent unauthorized access to the vehicle information system 300 or sensitive user (or passenger) information, such as user purchase authorization information. Preferably, no connection between external users and mobile platform passengers (other than authorized administrators) and internal, mission critical databases in the security enclave is allowed. The private switching system 321A can communicate with the broadband communication system 510; whereas, the public switching system 321B communicates with one or more wireless access points 368. The private switching system 321A and the public switching system 321B can communicate directly and/or indirectly, such as via a server system, such as a file server system 528.

The broadband control system 514 likewise is shown as being in communication with the aircraft interface system 522, which provides an interface between the vehicle information system 300 and aircraft avionics equipment (not shown) installed aboard a wide-body aircraft 390B (shown in FIG. 2B). The file server system 528 can communicate with the broadband control system 514 and can be coupled with a data loading system 529. Information, such as media content and/or cabin configuration data, can be provided to the vehicle information system 300 via the data loading system 529. The data loading system 529 preferably is coupled with the file server system 528 via a Gigabit (such as 1000Base-X and/or 1000Base-T) Ethernet communication port.

As desired, one or more other types of vehicle information system elements can be coupled with the broadband control system 514. A crew terminal (or panel) 524 can provide a user interface for permitting a crew of a passenger vehicle 390 (shown in FIGS. 4A-B) to control system configurations and/or features of the vehicle information system 300. Exemplary system configurations and/or features that can be controlled via the crew terminal 524 can include displaying (and/or changing) a seat layout of the passenger seats 382 (shown in FIGS. 4A-B) within the passenger cabin 380 (shown in FIGS. 4A-B) of a passenger vehicle 390 (shown in FIGS. 4A-B), public address (or PA) zones within the passenger cabin 380, database control, audio channel assignments, and/or power control for one or more personal media devices 200. The crew terminal 524 likewise can be used to perform system BITE and/or software downloads for the vehicle information system 300. The broadband control system 514 can be coupled with a terminal wireless local area network (LAN) system 526 and/or a telephone system 525, such as a PicoCell telephone system that supports mobile telephone connectivity within the passenger vehicle 390 via the vehicle information system 300.

Figure 7B:
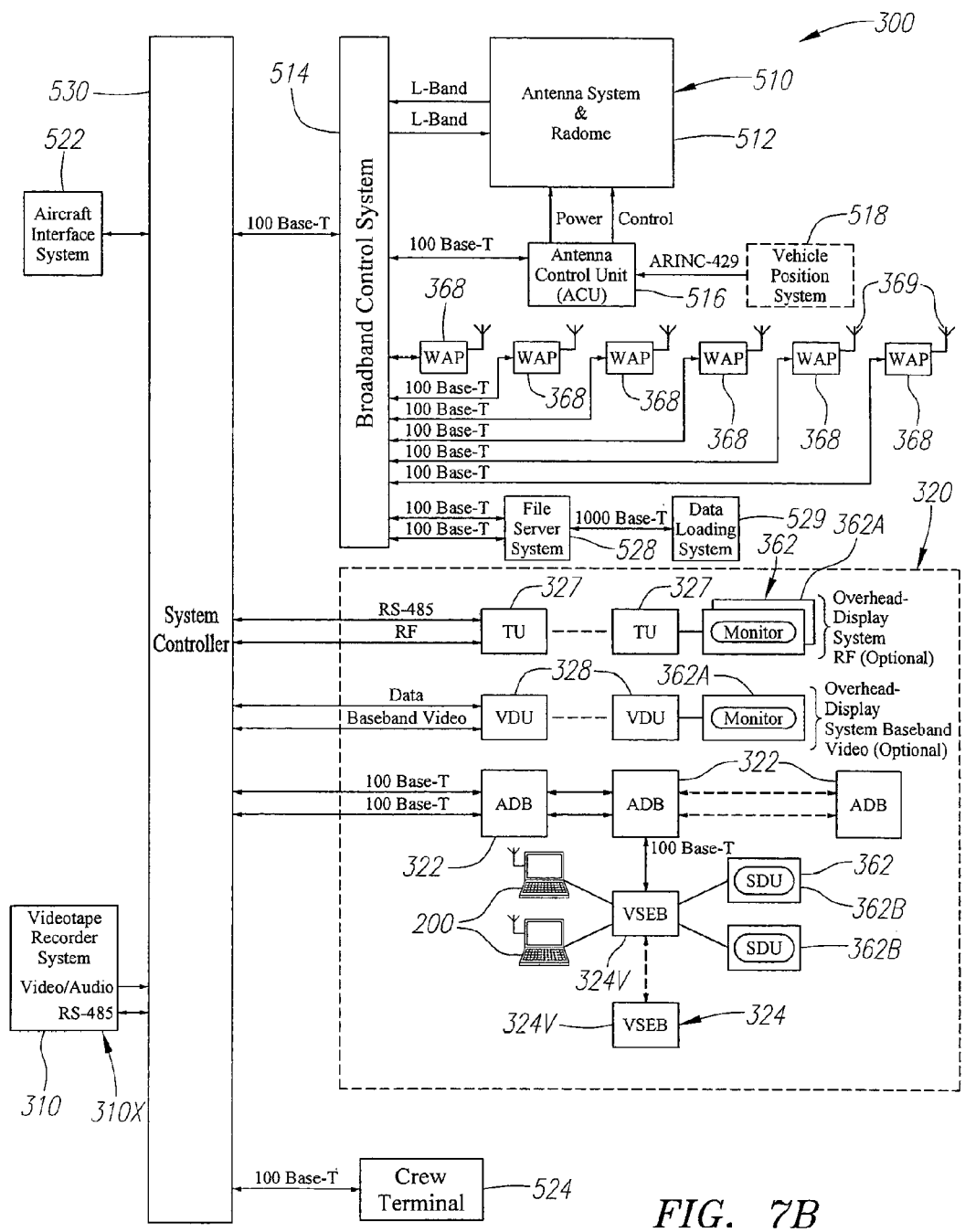
FIG. 7B is an exemplary detail drawing illustrating an alternative embodiment of the vehicle information system of FIG. 6, wherein the vehicle information system is suitable for installation aboard an aircraft with a narrow-body configuration.

Public address (or PA) audio can be provided to the vehicle information system 300 via the broadband control system 514 and/or a system controller 530 (shown FIG. 7B). If provided in a baseband format, the public address audio can be provided to the broadband control system 514 and/or the system controller 530 from the aircraft interface system 522. The broadband control system 514 and/or the system controller 530 preferably digitize and/or encode the baseband public address audio into an Ethernet data stream and distribute the digitized public address audio to the passenger seats 382 via the content distribution system 320. For example, the digitized public address audio can be provided to the switching systems 321 and area distribution boxes (ADBs) 322 (shown in FIGS. 7B-C) for presentation via the audio systems 250 (shown in FIG. 4B) of the respective personal media devices 200 and/or the audio presentation system 364 (shown in FIGS. 4A-B) of the vehicle information system 300. Upon receiving the digitized public address audio, the audio systems 250 and/or the audio presentation system 364 can decode the digitized public address audio into analog audio and present the analog public address audio. Preferably, the public address audio takes priority over any other viewing content 210 being presented by the audio systems 250 and/or the audio presentation system 364.

The wireless access point 368 is shown as including an access point antenna system 369. The access point antenna system 369 can transmit and/or receive broadband radio frequency communication signals (not shown) between the vehicle information system 300 and one or more personal media devices 200. The communication ports (or connectors) 270 of the personal media device 200 is illustrated as including a device antenna system 270A for communicating with the access point antenna system 369. The access point antenna system 369 and the device antenna system 270A can comprise any conventional types of antenna systems suitable for transmitting and/or receiving the broadband radio frequency communication signals between the vehicle information system 300 and the personal media devices 200.

The vehicle information system 300 of FIG. 7B is suitable for installation aboard an aircraft 390B (shown in FIG. 2B) with a narrow-body configuration. The broadband antenna system 512, the broadband control system 514, and the wireless access point 368 are shown as being provided in the manner set forth above with reference to FIG. 7A. The vehicle information system 300 is shown as including a system controller 530. The system controller 530 is coupled with the content distribution system 320 and provides an interface for providing selected aircraft and other avionics information, such as Aeronautical Radio Incorporated (ARINC) Standard 429 signaling, Ethernet signaling, discrete input/output keylines, public address audio, flight mapping data, to the vehicle information system 300. The system controller 530 thereby can serve as a gateway between aircraft avionics equipment (not shown) and the vehicle information system 300. As desired, the system controller 530 can be coupled with one or more content sources 310, such as a video tape recorder system 310X, for providing viewing content 210 for presentation aboard the vehicle information system 300.

As shown in FIG. 7B, the content distribution system 320 of the vehicle information system 300 can include a plurality of tapping units 327 for providing radio frequency video signals to video presentation system 362, such as overhead cabin display systems 362A. Baseband video signals likewise can be distributed to the overhead cabin display systems 362A via one or more video distribution systems 328. The tapping units 327 and/or the video distribution systems 328 preferably are provided as line replaceable units (LRUs) in the manner set forth above. As desired, digital video signals can be distributed via one or more high-speed 10/100/1000 Base-SX/T Ethernet communication connections. The content distribution system 320 can include at least one video seat electronics boxes (VSEBs) 324V that are provided in the manner set forth above with reference to the seat electronics boxes (SEBs) (and/or premium seat electronics boxes (PSEBs)) 324 (shown in FIG. 3). The video seat electronics boxes 324V can provide the digital video signals to a selected video presentation system 362, such as a seatback display system 362B of the vehicle information system 300 and/or a video display system 240 (shown in FIG. 4B) of the personal media device 200, for presentation.

Figure 7C:
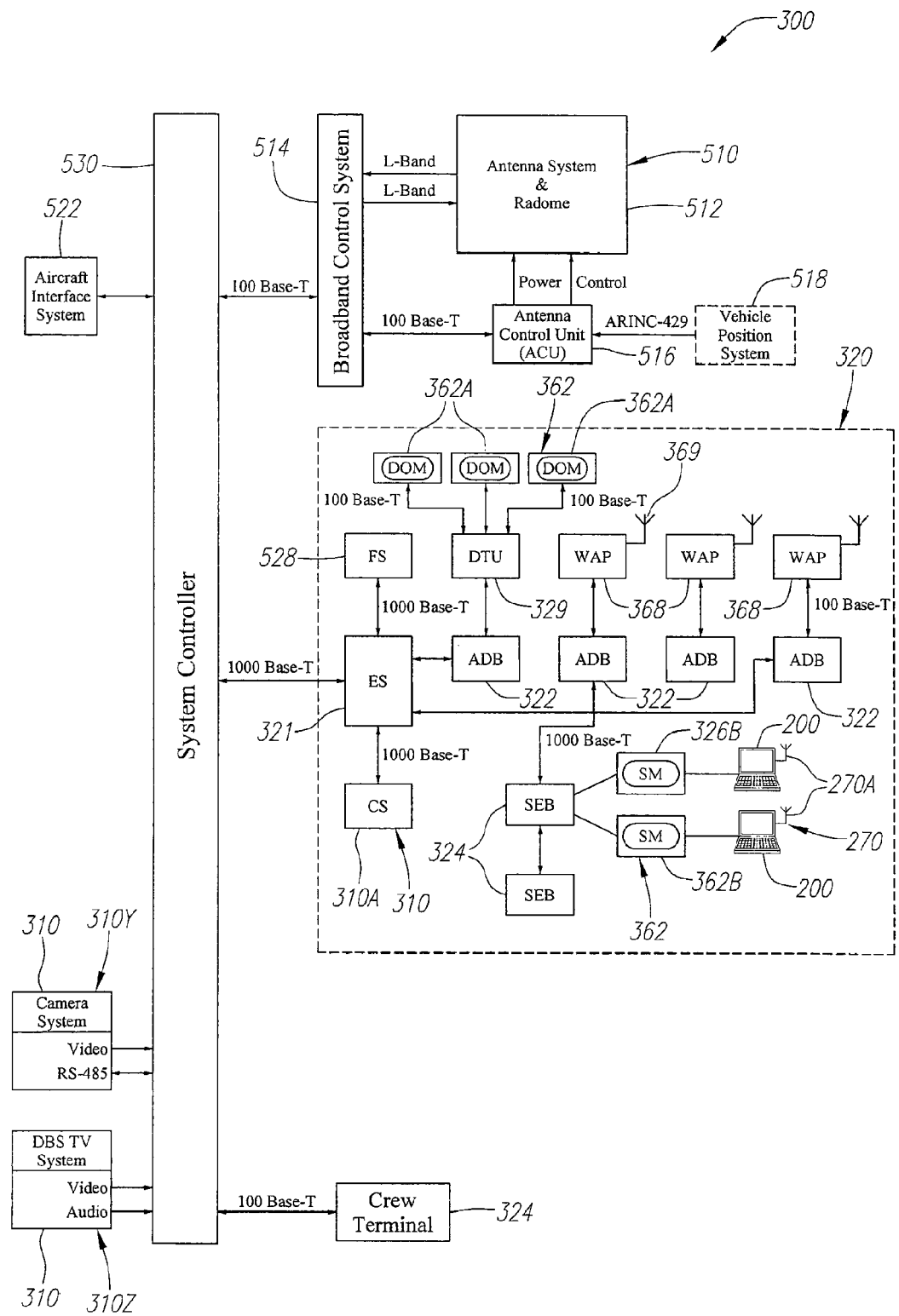
FIG. 7C is an exemplary detail drawing illustrating an alternative embodiment of the vehicle information system of FIG. 6, wherein the vehicle information system is suitable for installation aboard an aircraft with a wide-body configuration.

Turning to FIG. 7C, the vehicle information system 300 is shown as being suitable for installation aboard an aircraft 390B (shown in FIG. 2B) with a wide-body configuration. The broadband antenna system 512, the broadband control system 514, and the wireless access point 368 are provided in the manner set forth above with reference to FIG. 7A. As illustrated in FIG. 7C, the system controller 530 of the vehicle information system 300 can be coupled with the content distribution system 320 and provides an interface for providing selected aircraft and other avionics information, such as Aeronautical Radio Incorporated (ARINC) Standard 429 signaling, Ethernet signaling, discrete input/output keylines, public address audio, flight mapping data, to the vehicle information system 300. The system controller 530 thereby can serve as a gateway between aircraft avionics equipment (not shown) and the vehicle information system 300. As desired, the system controller 530 can be coupled with one or more content sources 310, such as a camera system 310Y and/or a direct broadcast satellite (DBS) television system 310Z, for providing viewing content 210 for presentation aboard the vehicle information system 300.

FIG. 7C shows that the content distribution system 320 of the vehicle information system 300 can include a one or more digital tapping units 329 for providing video signals to video presentation system 362, such as overhead cabin display systems 362A. As desired, digital video signals can be distributed via one or more high-speed 10/100/1000 Base-SX/T Ethernet communication connections. The content distribution system 320 can include at least one seat electronics boxes (SEBs) 324. The seat electronics boxes 324 can provide the digital video signals to a selected video presentation system 362, such as a seatback display system 362B of the vehicle information system 300 and/or a video display system 240 (shown in FIG. 4B) of the personal media device 200, for presentation. The vehicle information system 300 likewise is shown as including at least one media (or content) server system 310A in the manner discussed in more detail above with reference to FIGS. 2A-B.

Figure 8:
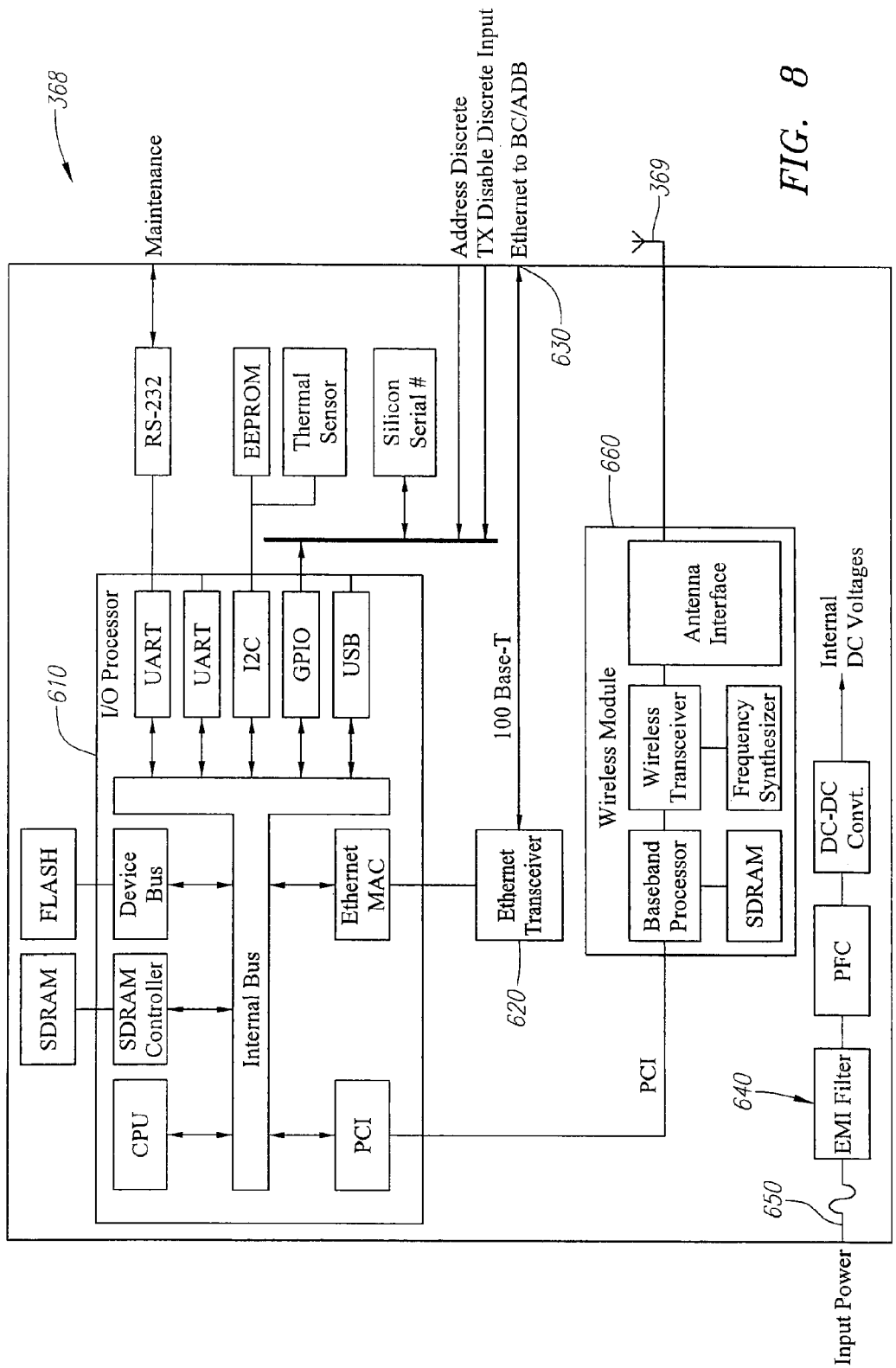
FIG. 8 is an exemplary detail drawing illustrating an embodiment of a wireless access point for the vehicle information system of FIG. 6.

An exemplary wireless access point 368 for the vehicle information system 300 (shown in FIGS. 7A-C) is illustrated in FIG. 8. The wireless access point 368 is shown as including an input/output (I/O) processor system 610 that communicates with an Ethernet transceiver 620. The wireless access point 368 has a communication port 630 for exchanging Ethernet signals (not shown) with the broadband control system 514 (shown in FIGS. 7A-C) and/or a selected area distribution box (ADB) 322 (shown in FIGS. 7B-C) of the vehicle information system 300. The input/output (I/O) processor system 610 likewise can communicate with a wireless module system 660. The wireless module system 660 is coupled with the access point antenna system 369 and enables the access point antenna system 369 to transmit and/or receive broadband radio frequency communication signals (not shown) between the vehicle information system 300 and one or more personal media devices 200 (shown in FIGS. 7A-C). As shown in FIG. 8, the wireless access point 368 includes a power supply system 640 that received incoming power from the area distribution box (ADB) 322 and that provides operating power for the wireless access point 368.

In operation, the vehicle information system 300 advantageously can support bidirectional data transfers at significant data rates. For example, the vehicle information system 300 can support (forward link) data downloads with data rates of up to approximately 10 Mbps-15 Mbps or higher and (return link) data uploads with data rates of up to approximately 1.5 Mbps or higher. The bandwidth used by a typical passenger (or user) during eight hours of travel can be about 7 Mbps. The vehicle information system 300 can permit access to the Internet 310C in any conventional manner, including via a personal media device 200 (shown in FIG. 4B) that communicates with the vehicle information system 300 via a wired and/or wireless access point 368 and/or via a user (or passenger) interface systems 360 (shown in FIGS. 4A-B), such as a seatback display systems 362B (shown in FIGS. 4A-B), of the vehicle information system 300. As desired, the personal media device 200 can comprise a stand-alone installation such that the personal media device 200 operates as an independent passenger data network via the access point 368. Connectivity preferably is accomplished via the personal media device 200.

When installed aboard an aircraft 390B, for example, the vehicle information system 300 preferably presents a broadband portal application that provides users (or passengers) with onboard access to a premier set of in-flight Intranet and Internet, information, entertainment, communications, and/or other system services during travel. Selected system services may be provided at no cost to the user (or passenger); whereas, other selected system services may require payment of a fee before access to the system services is permitted. The system services can include access to websites on the World Wide Web via the onboard intranet. Thereby, the user can have direct access to virtually any site on the Internet 310C. Access to selected sites, such as web sites that present obscene or otherwise objectionable material, may be limited during travel. Stated somewhat differently the vehicle information system 300 can provide website filtering/blocking of objectionable content, unauthorized site and services which require excess bandwidth. The ground network operations center (NOC) 440 (shown in FIG. 5) likewise can filter/block the inappropriate URLs/unauthorized site before they are sent to the vehicle information system 300. The user likewise can send and/or receive electronic mail (or email) message by directly accessing their business and/or personal email accounts. As desired, an authorized user can establish a connection to a virtual private network (VPN). The user can access instant messaging (IM) and/or Short Message Service (SMS).

The user can access viewing content 210 stored by the vehicle information system 300. The stored viewing content 210 can include premium viewing content 210, such as selected television programming, movies, and/or short films. Electronic magazines (e-zines), newspapers and other publications likewise can be provided as the viewing content 210. The vehicle information system 300 preferably provides a standard selection of publications and/or publications that are specifically selected to appeal to user demographics. As desired, the viewing content 210 can be selected and/or manipulated to increase font size and reviewed while on the aircraft 390B. Electronic publications may be removed from the aircraft 390B if purchased.

Additionally, and/or alternatively, the user can access onboard games and/or view advertising, news, weather, sports financial, and/or other types of viewing content 210. The viewing content 210 can be selected, for example, based upon the user's interests and/or the region of travel. The advertising content can include Web advertising content. The user likewise can access airline information content, which can includes maps, connecting gate information, arrival/departure information, and/or destination information based on airline preference. The vehicle information system 300 can offer viewing content 210 provided via one or more channels of Internet Protocol Television (IPTV) programming and/or Internet Protocol (IP) Radio programming. The IPTV programming can include live programming that is focused on news and sports. Other types of IPTV programming may be delivered over the broadband link but not in a real-time fashion and usually during non-peak network demand periods.

As set forth above, selected system services of the vehicle information system 300 may require payment of a fee before access to the system services is permitted. Exemplary fee-based system services can include pay-per-use services and/or in-flight shopping. The pay-per-use services can include specialty system services, such as streaming audio, streaming video, Internet Protocol Television (IPTV) programming, and system services that utilize the broadband telecommunications link with the terrestrial content system 400. Exemplary system services that utilize the broadband telecommunications link include instant messaging (IM), Short Message Service (SMS), restaurant reservations, tee times, online bookings, and and/or access to games. The fee for these system services can vary based on the particular feature accessed. The vehicle information system 300 likewise can provide computer games and/or multi-player games, which can be charged on an unlimited play of a title basis and/or unlimited play of games from the same distributor.

In-flight shopping advantageously permits a user (or Web shopper) to make purchases by browsing a selected Web site, selecting an item registering on the site, providing a credit card number and shipping information. The sales information can be transmitted to the Web vendor who, upon verifying the credit card information, ships the purchased item. The preferably receives a confirmation number. As desired, the graphic content of e-commerce web sites can be re-hosted and stored on the server system 310A (shown in FIGS. 2A-B). At least one network operations center (NOC) 440 (shown in FIG. 5), such as the network operations center 440B (shown in FIG. 5), can monitor changes that occur on the ground web sites. The network operations center 440 thereby can synchronize the airborne viewing content 210 with the ground-based viewing content 210 and provide regular updates for pricing, product, etc. Preferably, the vehicle information system 300 can select appropriate e-commerce partners to match user demographics and preferences regarding markets and services.

If he elects to make a purchase while browsing the selected Web site, the users can provide purchase authorization information, such as credit card verification information, to confirm that the user is authorized to make the purchase. As desired, the vehicle information system 300 can include a card reader (not shown) for reading purchase authorization information provided by various types of cards, such as credit cards, frequent flyer cards, and the like. The card reader preferably is disposed adjacent to the passenger seats 382 (shown in FIGS. 4A-B). The vehicle information system 300 can authenticate the purchase authorization information in real time to avoid transaction processing delays and potential fraud. As needed, the vehicle information system 300 can cache the purchase authorization information while the satellite link is not available. The purchase authorization information thereby can be transmitted once the satellite link becomes available. The vehicle information system 300 preferably provides purchase confirmation information, such as a confirmation number, upon verifying the purchase authorization information.

Figure 9:
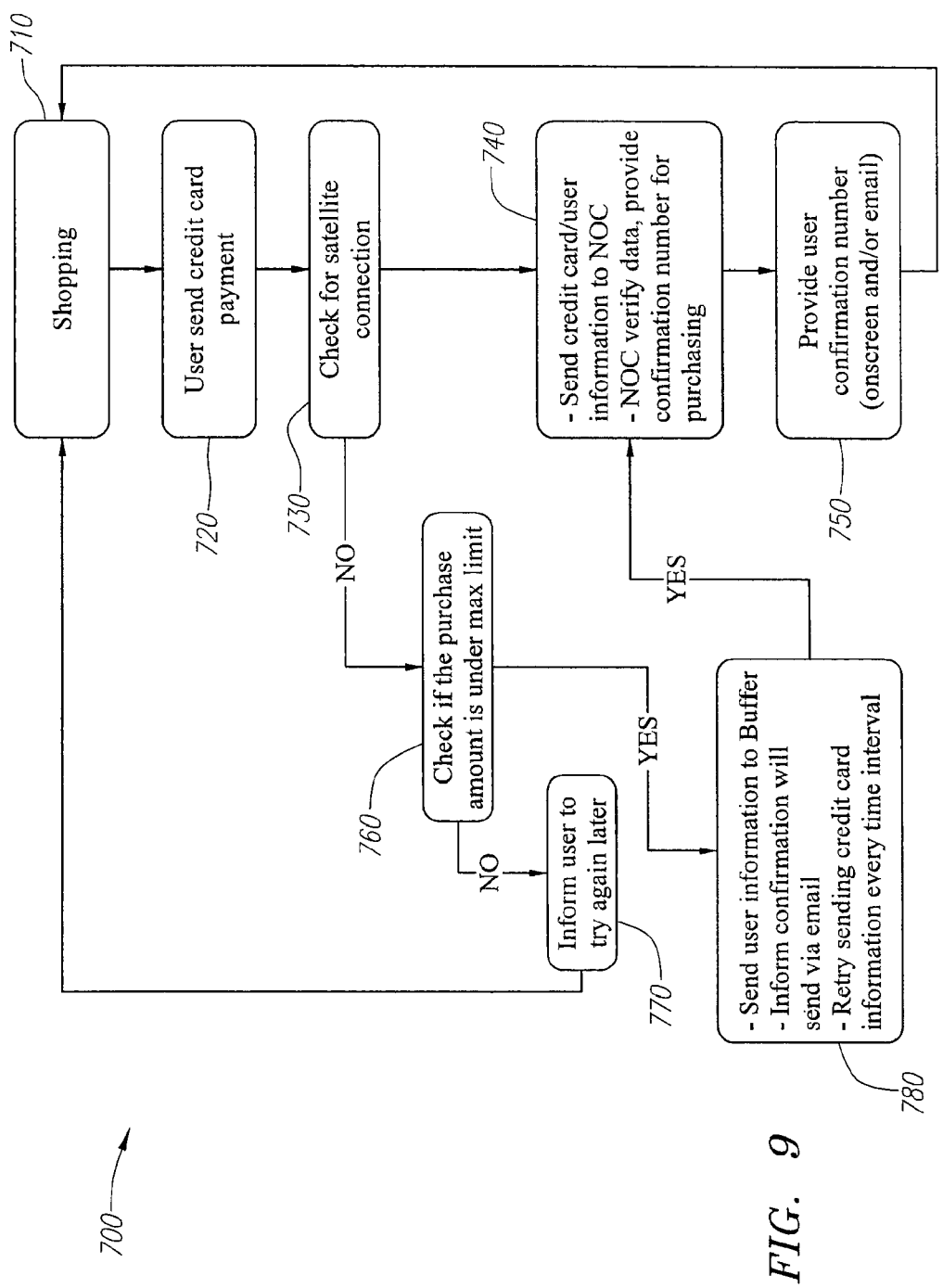
FIG. 9 is an exemplary flow chart illustrating an embodiment of a wireless access point for the vehicle information system of FIG. 6.

An exemplary confirmation process 700 for confirming credit card authorization information is shown in FIG. 9. At 710, a user browses (or shops) at the selected Web site. Upon deciding to make a purchase from the selected Web site, the user, at 720, provides credit card payment information (and/or shipping and other user information) to the vehicle information system 300 (shown in FIGS. 2A-B). The vehicle information system 300 confirms whether the satellite link to the satellite communication system 370A (shown in FIG. 2B) is available, at 730. If the satellite link is available, the vehicle information system 300, at 740, transmits the credit card payment information (and/or shipping and other user information) to the network operations center (NOC) 440 (shown in FIG. 5). The network operations center 440 verifies the credit card payment information (and/or shipping and other user information) and, upon verifying the information, provides a confirmation number to the vehicle information system 300. At 750, the vehicle information system 300 provides the confirmation number to the user.

If the vehicle information system 300, at 730, determines that the satellite link is not available, the vehicle information system 300, at 760, can determine whether the purchase amount is less than (or equal to) a predetermined maximum purchase limit. At 770, the vehicle information system 300 requests that the user try to make his purchase at a later time if the purchase amount is greater than the predetermined maximum purchase limit. Otherwise, the vehicle information system 300, at 780, sends the credit card payment information (and/or shipping and other user information) to a buffer system (not shown). The vehicle information system 300 informs the user that the confirmation number will be provided via electronic mail (or e-mail) and/or periodically attempts to transmit the credit card payment information (and/or shipping and other user information) to the network operations center 440. The vehicle information system 300 can attempt to transmit the credit card payment information (and/or shipping and other user information) in accordance with any suitable criteria, such as a predetermined time interval.

In a preferred embodiment, the vehicle information system 300 can collect and/or report data necessary to support billing of commercial services on a per user per session basis including date/time/duration of service, airline code/flight number, user identification number (or code), payment option, pricing plan, type of service, applicable promotions and discounts with associated expiration dates, and/or geographic region of service. Exemplary billing information can include an aircraft identification number (or code), a date of network activity, a time and/or duration of the network activity, a region of the network activity, and/or any unique usage/events (i.e. paid-per-use service). The vehicle information system 300 likewise can data necessary to support billing of customers based on bandwidth usage for transmittal of customer-specific content, data, and/or off-board transactions. As desired, the vehicle information system 300 can permit users to select a subscription payment plan at login, to cancel their subscriptions, and/or to select a subscription payment plan during account maintenance.

Users can perform maintenance on their user accounts at any time. For example, the vehicle information system 300 can provide free user access to user account services when the radio frequency (RF) link connectivity active. After travel is complete, users can maintain their user accounts via a ground portal (not shown). Users preferably are be required to authenticate their identities prior to accessing the account information. As desired, any user purchase authorization information, such as credit card numbers, entered during account maintenance can be immediately verified. For example, credit card information can be verified to confirm that the card number entered is valid and is approved for a nominal charge.

Users likewise can access system registration services at any time, such as via the ground portal and/or via the vehicle information system 300 when the radio frequency (RF) link connectivity active. After travel is complete, users can maintain their user accounts via a ground portal (not shown). Access to the system registration services preferably is provided at no cost to the user. On-line, self-help customer support, including web-based informational sources and answers to frequently asked questions (FAQs) likewise can be made available to users. As desired, the system can collect information to identify specific aircraft that are active on the network.

To help assure secure transactions, communications between the vehicle information system 300 and the content system 400 preferably are encrypted. Wireless security software likewise can be implemented for safety transaction. The vehicle information system 300 can protect itself from viruses. If the anti-virus software is used, for example, the anti-virus software can be updated on a time basis to maintain currency of data files and scanning engine from the virus protection software vendor that include signatures identifying the latest viruses. The vehicle information system 300 likewise can purge all user data before the end of travel. Such user data can include, but is not limited to, user name, account information, purchase authorization information, and/or user activities.

Figure 10A:
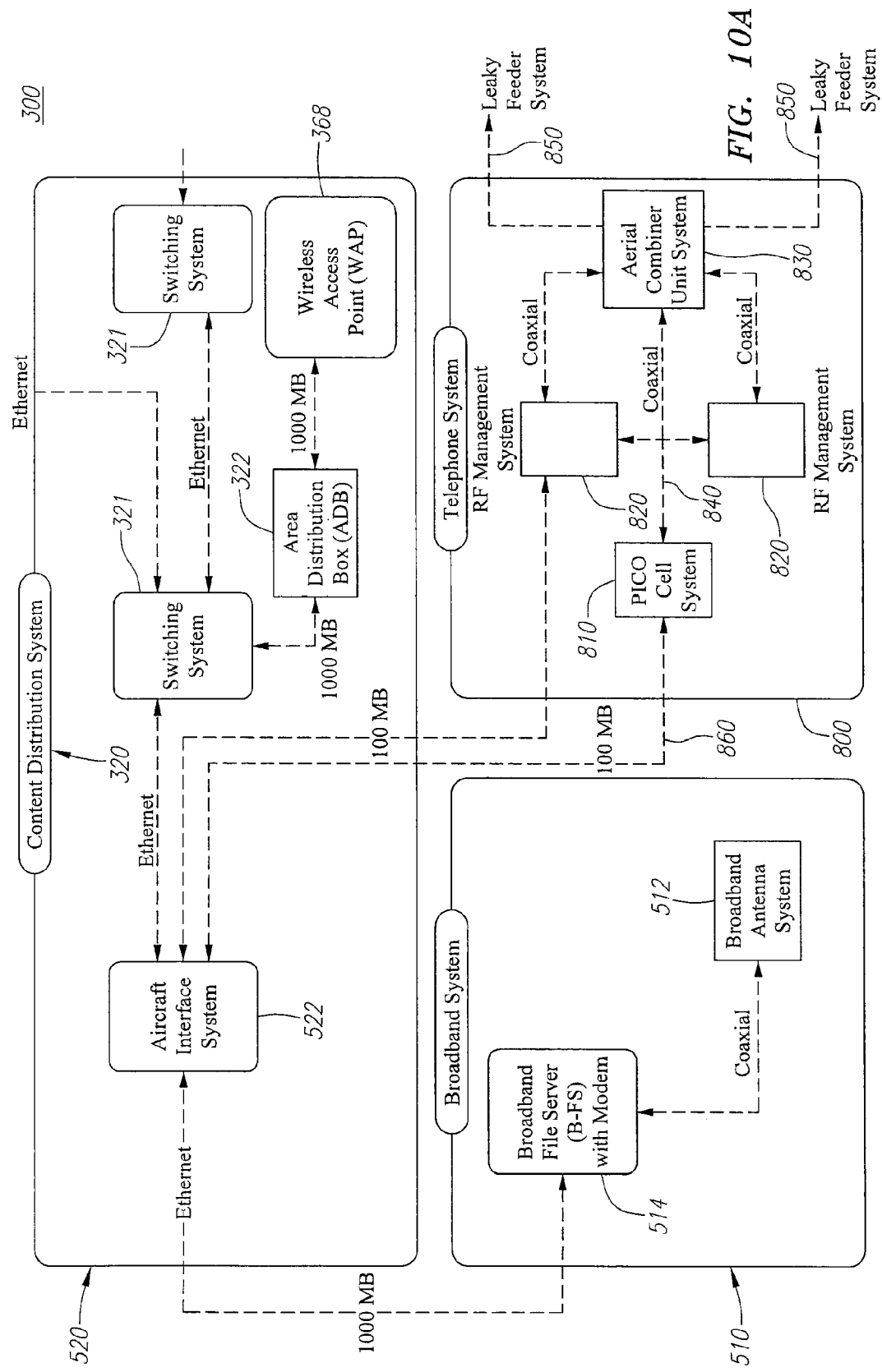
FIG. 10A is an exemplary detail drawing illustrating an embodiment of the vehicle information system of FIG. 6, wherein the vehicle information system includes a telephone system.

Turning to FIG. 10A, the vehicle information system 300 is shown as including a telephone system 800. Like the telephone system 525 (shown in FIG. 7A), the telephone system 800 can be provided as a PicoCell telephone system and/or can support mobile telephone connectivity within the passenger vehicle 390 (shown in FIGS. 2A-B). The vehicle information system 300 thereby enables users (or passengers) to operate their personal cellular telephones (not shown) and other personal media devices 200 (shown in FIG. 4B) that support cellular communication connections while traveling aboard the passenger vehicle 390. By integrating the telephone system 800, the vehicle information system 300 advantageously can provide robust cellular telephone service that has greater simultaneous calling capacity and that has lower per minute cost than conventional cellular telephone systems.

As shown in FIG. 10A, the telephone system 800 can include a PicoCell system 810 that communicates with one or more radio frequency (RF) management systems 820 and/or aerial combiner unit (ACU) systems 830. The PicoCell system 810, the radio frequency (RF) management systems 820, and the aerial combiner unit systems 830 are shown as communicating via coaxial communication connections 840. Each aerial combiner unit system 830 provides at least one leaky feeder system 850 for exchanging cellular communication signals with the personal cellular telephones and other personal media devices 200. In the manner set forth in FIG. 7A, the PicoCell system 810 and/or at least one of the radio frequency management systems 820 can communicate with the aircraft interface system 522 via a high-speed 10/100/1000 Base-SX/T Ethernet communication connection 860.

The telephone system 800 preferably receives the cellular communication signals and converts the cellular communication signals into a Voice-over-Internet-Protocol (VoIP) format for transmission to the content system 400 via the broadband communication system 510 and the satellite communication system 370A (shown in FIG. 2B). The content system 400 exchanges the VoIP signals with the Internet 310C (shown in FIG. 2B). Incoming VoIP signals can be converted by the telephone system 800 into cellular communication signals that are transmitted to the personal cellular telephones and other personal media devices 200. The vehicle information system 300 thereby can provide a predetermined number of cellular telephone channels for cabin internal seat-to-seat communication and/or for air-to-ground communication. As desired, a telephone handset system can be integrated into a selected passenger seat 382 (shown in FIGS. 4A-B) and interfaced with the headend system 310H (shown in FIG. 3).

Figure 10B:
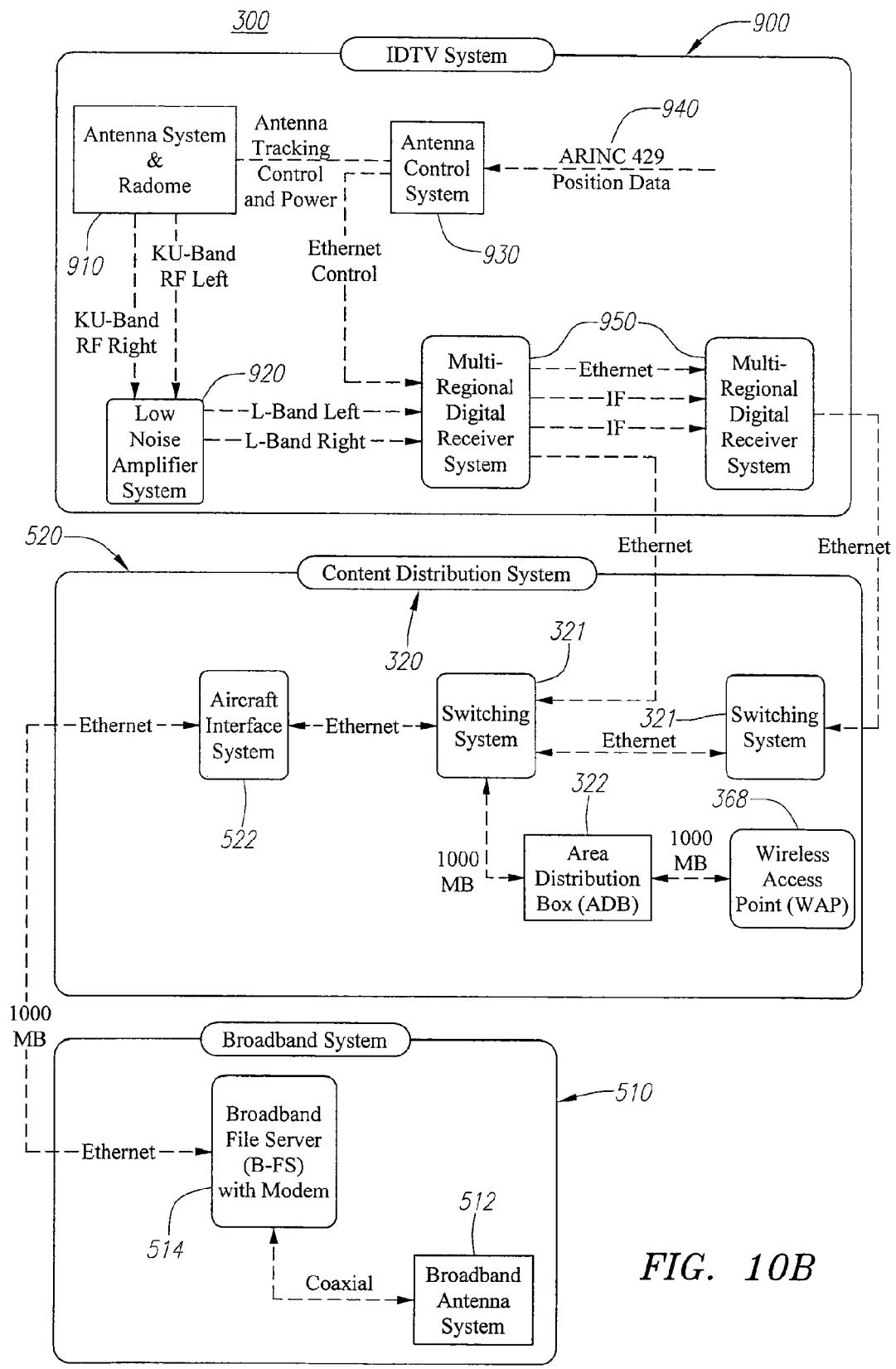
FIG. 10B is an exemplary detail drawing illustrating an alternative embodiment of the vehicle information system of FIG. 6, wherein the vehicle information system includes an integrated digital television (IDTV) system.

Alternatively, and/or additionally, the vehicle information system 300 can include a television system. Turning to FIG. 10B, for example, vehicle information system 300 is shown as including an integrated digital television (IDTV) system 900. An exemplary integrated digital television system is shown and described in the above-referenced co-pending United States patent application, entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005. The integrated digital television system 900 is illustrated as including a digital television antenna system 910 and a digital television antenna control unit (ACU) 930. Preferably being disposed under, and protected by, a radome, the digital television antenna system 910 can be provided in the manner set forth above with reference to the broadband antenna system 512 and operates under control of a multi-regional digital receiver (MRDR) system 950.

The digital television antenna control unit 930 can track communication signals from the satellite communication system 370A (shown in FIG. 2B) and providing alignment data to the digital television antenna system 910. As illustrated in FIG. 10B, position data 940 can be provided to the digital television antenna control unit 930 by a vehicle position system (not shown), such as a Global Positioning Satellite (GPS) system and/or an Inertial Reference System (IRS). The digital television antenna control unit 930 thereby can initiate and/or maintain communication between the digital television antenna system 910 and the satellite communication system 370A. The digital television antenna control unit 930 can direct the digital television antenna system 910 toward a selected satellite communication system 370A that can be the same and/or different satellite communication system 370A at which the broadband antenna system 512 is directed.

If the television viewing content 210 (shown in FIGS. 2A-B) is provided as a pair of oppositely-polarized signals, a low-noise amplifier (LNB) system 920 can amplify the pair of oppositely-polarized signals as illustrated in FIG. 10B. The low-noise amplifier (LNB) system 920 likewise can downconvert the pair of oppositely-polarized signals from being high-frequency signals within the Ku-Band (10.7 GHz-12.75 GHz) into a pair of intermediate-frequency (or low-frequency) signals within a predetermined intermediate-frequency (or low-frequency) band, such as the L-Band (950 MHz-2150 MHz).

The intermediate-frequency (or low-frequency) signals can be provided to one or more multi-regional digital receiver systems 950. Each multi-regional digital receiver system 950 selects a predetermined television channel from the television viewing content 210. Being in communication with selected switching systems 321, the multi-regional digital receiver systems 950 provide the predetermined television channels to the content distribution system 320 for presentation at the passenger seats 382 (shown in FIGS. 4A-B) in the manner set forth in more detail above.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A vehicle information system suitable for installation aboard a passenger vehicle and for supporting broadband communications with a terrestrial content source via a preselected satellite communication system during travel, comprising:

a first broadband control system for supporting bidirectional broadband data communication with the terrestrial content source via a first broadband data satellite link; and a content distribution system disposed aboard the passenger vehicle for distributing selected viewing content received by said first broadband control system from the terrestrial content source throughout the vehicle information system, said content distribution system including a switching system being segmented into a private switching system for communicating with said first broadband control system and a public switching system for communicating with a wireless access point, wherein said switching system prevents unauthorized wireless access to said private switching system by unauthorized persons inside or outside of the passenger vehicle.

2. The vehicle information system of claim 1, further comprising a telephone system for supporting cellular telephone connectivity by exchanging telephone communication signals over said content distribution system via said switching system.

3. The vehicle information system of claim 2, wherein said telephone system further includes a PicoCell telephone system.

4. The vehicle information system of claim 1, further comprising a second broadband control system for communicating with a second broadband data satellite link and for supporting bidirectional telephone connectivity within the passenger vehicle via the vehicle information system.

5. The vehicle information system of claim 1, further comprising a data loading system being in communication with said content distribution system for supporting bidirectional configuration communication within the passenger vehicle via the vehicle information system.

6. The vehicle information system of claim 5, wherein said bidirectional configuration communication includes transferring at least one of media content, cabin configuration data, system built-in test equipment commands, and software downloads.

7. The vehicle information system of claim 1, wherein at least one of said first broadband data satellite link, said first broadband control system, said switching system and said wireless access point is provided as a line replaceable-unit.

8. The vehicle information system of claim 1, wherein said wireless access point enables a personal media device disposed aboard the passenger vehicle to securely communicate with the terrestrial content source.

9. The vehicle information system of claim 1, further comprising a local content source and a headend system for providing overall system control functions for the vehicle information system, wherein said local content source is at least partially integrated with said headend system, wherein a personal media device disposed aboard the passenger vehicle is enabled to select and present viewing content available from said local content source.

10. The vehicle information system of claim 1, wherein said content distribution system is selected from a group consisting of a wired distribution system and a wireless distribution system.

11. The vehicle information system of claim 1, further comprising a satellite link control system for directing said first broadband data satellite link toward the preselected satellite communication system.

12. The vehicle information system of claim 11, wherein said satellite link control system directs said first broadband data satellite link based upon a comparison of a position of the passenger vehicle with a position of the preselected satellite communication system.

13. The vehicle information system of claim 12, wherein said satellite link control system receives the position of the passenger vehicle from a vehicle position system selected from a group consisting of a Global Positioning Satellite system and an Inertial Reference System.

14. The vehicle information system of claim 1, further comprising an operator device disposed aboard the passenger vehicle for communicating with said first broadband control system.

15. The vehicle information system of claim 1, wherein the vehicle information system is suitable for installation aboard the passenger vehicle selected from a group consisting of an automobile, an aircraft, a bus, a recreational vehicle, a boat and a locomotive.

16. A method for supporting broadband communications between a vehicle information system disposed aboard a passenger vehicle and a terrestrial content source via a preselected satellite communication system, comprising:

establishing, by the vehicle information system, a bidirectional broadband data communication connection with the terrestrial content source via a first broadband data satellite link; and distributing, by the vehicle information system, selected viewing content received from the terrestrial content source throughout the vehicle information system via a switching system being segmented into a private switching system for communicating with said first broadband control system and a public switching system for communicating with a wireless access point, wherein the switching system prevents unauthorized wireless access to the private switching system by unauthorized persons inside or outside of the passenger vehicle.

17. The method of claim 16, wherein said distributing includes enabling the wireless access point to support secure communications between a personal media device disposed aboard the passenger vehicle and the terrestrial content source.

18. The method of claim 16, further comprising providing bidirectional telephone connectivity within the passenger vehicle by exchanging telephone communication signals over the switching system via a telephone system disposed within the vehicle information system.

19. The method of claim 16, further comprising establishing, by the vehicle information system, a second bidirectional broadband data communication connection for supporting telephone connectivity within the passenger vehicle via the vehicle information system.

20. A computer program product for supporting broadband communications between a vehicle information system disposed aboard a passenger vehicle and a terrestrial content source via a preselected satellite communication system, the computer program product being encoded on one or more non-transitory machine-readable storage media and comprising:

instruction for establishing, by the vehicle information system, a bidirectional broadband data communication connection with the terrestrial content source via a first broadband data satellite link; and instruction for distributing, by the vehicle information system, selected viewing content received from the terrestrial content source throughout the vehicle information system via a switching system being segmented into a private switching system for communicating with said first broadband control system and a public switching system for communicating with a wireless access point, wherein the switching system prevents unauthorized wireless access to the private switching system by unauthorized persons inside or outside of the passenger vehicle.

* * * * *